US012704465B2

(12) United States Patent
Zhao et al.

(10) Patent No.: US 12,704,465 B2
(45) Date of Patent: Aug. 11, 2026

(54) METHODS AND SYSTEMS FOR NANOSCALE IMAGING BASED ON SECOND HARMONIC SIGNAL GENERATION AND THROUGH-FOCUS SCANNING OPTICAL MICROSCOPY

(71) Applicant: KLA Corporation, Milpitas, CA (US)

(72) Inventors: Qiang Zhao, Milpitas, CA (US); Ming Di, Pleasanton, CA (US)

(73) Assignee: KLA Corporation, Milpitas, CA (US)

( * ) Notice: Subject to any disclaimer, the term of this patent is extended or adjusted under 35 U.S.C. 154(b) by 57 days.

(21) Appl. No.: 18/626,240

(22) Filed: Apr. 3, 2024

(65) Prior Publication Data

US 2024/0353352 A1 Oct. 24, 2024

Related U.S. Application Data

(60) Provisional application No. 63/460,032, filed on Apr. 18, 2023.

(51) Int. Cl.
*G01N 21/95* (2006.01)
*G01N 21/88* (2006.01)

(52) U.S. Cl.
CPC ..... *G01N 21/9505* (2013.01); *G01N 21/8806* (2013.01)

(58) Field of Classification Search
CPC ........... G01N 21/8806; G01N 21/9505; G01N 21/9501

(Continued)

(56) References Cited

U.S. PATENT DOCUMENTS 7,158,284 B2 1/2007 Alles et al.
12,158,492 B2 * 12/2024 Lei .................... G01R 31/2601

(Continued)

FOREIGN PATENT DOCUMENTS

KR 10-2020-0032801 A 3/2020
WO 2019-075165 A1 4/2019

OTHER PUBLICATIONS

International Search Report mailed on Jul. 25, 2024, for PCT Application No. PCT/US2024/024700 filed on Apr. 16, 2024 by KLA Corporation, 3 pages.

(Continued)

*Primary Examiner* — Tri T Ton
(74) *Attorney, Agent, or Firm* — Spano Law Group

(57) ABSTRACT

Methods and systems for improved detection of defects of interest and measurement of structures buried within complex three dimensional semiconductor structures are described herein. Through-focus scanning optical microscopy (TSOM) using non-linear, second harmonic generation (SHG) light signals emitted from a sample provides interface-selective sensitivity for metrology and inspection of advanced semiconductor structures. A TSOM/SHG system includes a spectral filter to pass collected light at wavelengths corresponding to SHG emission. In some embodiments, a TSOM/SHG system includes an ultrafast, pulsed laser source emitting ultraviolet to near infrared wavelengths to efficiently induce SHG at surface interfaces. The halving of wavelength inherent to SHG enables a doubling of illumination wavelength without penalizing resolution. In a further aspect, a TSOM/SHG measurement system includes an exogenous illumination source, an external electric field source, or both, to induce a DC electric field at one or more interfaces of structures under illumination, thereby enhancing SHG emission.

20 Claims, 6 Drawing Sheets

(58) Field of Classification Search
USPC ...................... 356/239.1–239.8, 237.1–237.6
See application file for complete search history.

(56) References Cited

U.S. PATENT DOCUMENTS

2019/0107495 A1* 4/2019 Shafiei .............. G01N 21/9501
2020/0134773 A1 4/2020 Pinter
2021/0396510 A1 12/2021 Kim et al.
2022/0364850 A1 11/2022 Adler

OTHER PUBLICATIONS

Attota, R., et al., "Through-focus Scanning Optical Microscopy", Proc. of SPIE, vol. 8036, 803610, 2011.
Attota, R., et al., "Nanoparticle size determination using optical microscopes", Appl. Phys. Lett. 105, 163105 (2014).
Ryabko, M.V., et al., "Method for optical inspection of nanoscale objects based upon analysis of their defocused images and features of its practical implementation", Optics Express vol. 21, 24483, 2013.
Attota, R., et al., "Through-focus Scanning Optical Microscopy Applications", Proc. SPIE vol. 10677, 106770R (2018).
Lee, J.H., et al., "Motion-free TSOM using a deformable mirror", Optics Express, vol. 28(11), 16353, 2020.
Tok, E.S., et al., "Oscillatory optical second-harmonic generation from Si(001) surface during thin-film epitaxy", Appl. Phys. Lett., vol. 76, 933, 2000.
Price, J., et al., "Charge trapping defects in film stacks Si/SiO2/Hf(1−x)SixO2 characterized by spectroscopic second-harmonic Generation", J. Vac. Sci. Technol. B29, 04D101, 2011.
Cheema, Suraj S., et al., "Enhanced ferroelectricity in ultrathin films grown directly on silicon", Nature, vol. 580(4), 478, 2020.
Xia, Fangfang, et al., "Application of second harmonic generation in characterization of 2D materials", Journal of Inorganic Materials, vol. 36(10), 1022-1030, 2021.
International Roadmap for Devices and Systems, 2021 Update, IEEE.

* cited by examiner

METHODS AND SYSTEMS FOR NANOSCALE IMAGING BASED ON SECOND HARMONIC SIGNAL GENERATION AND THROUGH-FOCUS SCANNING OPTICAL MICROSCOPY

CROSS REFERENCE TO RELATED APPLICATION

The present application for patent claims priority under 35 U.S.C. § 119 from U.S. provisional patent application Ser. No. 63/460,032, entitled "Nanoscale Imaging Apparatus Combining Through-Focus Scanning Optical Microscopy (TSOM) and Second Harmonic Generation (SHG)," filed Apr. 18, 2023, the subject matter of which is incorporated herein by reference in its entirety.

TECHNICAL FIELD

The described embodiments relate to methods and systems for measurement of semiconductor specimens, and more particularly to semiconductor wafer inspection and metrology modalities.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection and metrology processes are used at various steps during a semiconductor manufacturing process to detect and measure defects on wafers to promote higher yield. As design rules and process windows continue to shrink in size, inspection and metrology systems are required to capture a wider range of physical defects while maintaining high throughput. Inspection systems such as unpatterned wafer inspection systems and patterned wafer inspection systems illuminate and inspect a wafer for undesired defects. As semiconductor design rules continue to evolve, the minimum defect size that must be detected continues to shrink in size. Semiconductor architectures continue to transition from two dimensional floating-gate architectures to fully three dimensional geometries. In some examples, film stacks and etched structures are very deep (e.g., up to six micrometers in depth, or more). Such high aspect ratio structures create challenges for patterned wafer inspection. The ability to measure defects buried within these structures is critical to achieve desired performance levels and device yield.

Furthermore, semiconductor manufacturing of semiconductor metal-oxide-semiconductor field effect transistor (MOSFET) devices is evolving from vertical fin based fin field effect transistor (FinFET) architectures to gate-all-around (GAA) architectures to achieve better performance, lower power, smaller area, and lower cost. Measurement of dimensions and defect inspection required for process control are becoming more demanding. FET devices manufactured in accordance with a GAA architecture, e.g., nanosheet FET devices, fork-sheet FET devices, and complementary nanosheet FET devices, feature multiple channel level structures, decreasing feature sizes of features, and small spaces between channels in GAA FET devices. In a GAA architecture, channels are aligned vertically and separated by a very small space, e.g., currently about 10 nanometers, and trending smaller. Buried defects are likely to be generated at the channel release etch process step. The defect feature size is typically less than 10 nanometers. In some examples, defect feature size is approximately 1 nanometer. The small size and buried nature of defects and channel spacing of GAA structures are extremely challenging for current defect inspection and dimensional metrology systems.

FIG. 1A is a simplified illustration of a GAA nanosheet device structure 10 having no defects after the GAA channel release process step. GAA nanosheet device structure 10 includes a silicon substrate 13, source and drain structures 11 and 12, inter-layer dielectric layer 14, gate spacer layers 15 and 16, inner spacers 17A-17C, and Silicon channels 18A-C.

FIG. 1B is a simplified illustration of a GAA nanosheet device structure 20 having an etch remaining defect 21 after the GAA channel release process step. Like numbered elements depicted in FIG. 1B are analogous to those depicted in FIG. 1A. The etch remaining defect is residue of sacrificial Silicon Germanium (SiGe) that is not completely etched away during the GAA channel release process step.

FIG. 1C is a simplified illustration of a GAA nanosheet device structure 30 having an channel erosion defect 31 after the GAA channel release process step. Like numbered elements depicted in FIG. 1C are analogous to those depicted in FIG. 1A. The channel erosion defect is diffusion of Germanium (Ge) from sacrificial Silicon Germanium (SiGe) into the Silicon lattice channel structure, and is then etched away during the GAA channel release process step, thus eroding part of the Silicon lattice channel structure.

FIG. 1D is a simplified illustration of a GAA nanosheet device structure 40 having a high channel roughness defect 41 after the GAA channel release process step. Like numbered elements depicted in FIG. 1D are analogous to those depicted in FIG. 1A. The channel roughness defect is sacrificial Germanium from sacrificial Silicon Germanium (SiGe) that diffuses into the Silicon lattice channel structure, and is then etched away during the GAA channel release process step, thus eroding part of the Silicon lattice channel structure. Surface roughness of a Silicon channel after the channel release etch process step results in carrier mobility degradation when surface roughness is approximately 1 nanometer or greater. Surface roughness of a Silicon channel is a defect that should be controlled in a modern semiconductor manufacturing process to less than 0.5 nanometers.

FIG. 1E is a simplified illustration of a GAA nanosheet device structure 50 having a void defect 51 adjacent to channel 18B after deposition of high-K dielectric layers 51A-D and metal gate layers 52A-D. Like numbered elements depicted in FIG. 1E are analogous to those depicted in FIG. 1A. As depicted in FIG. 1E, high-K dielectric layers 51A-D and metal gate layers 52A-D are deposited after the GAA channel release step. In the example depicted in FIG. 1E, a void 51 is left after metal gate fill.

The defects depicted in FIGS. 1B-1E are buried defects in a high aspect ratio (HAR) stack structure. The feature size of the defect is typically less than 10 nanometers, and may approach one nanometer. These exemplary defects are adjacent to the channel and are detrimental to device yield and performance. From a process control point of view, these defects are not tolerable. In addition to defect detection, process challenges related to GAA structures, such as those depicted in FIGS. 1A-1E, also include the measurement of individual channel critical dimensions, e.g., CD depicted in FIG. 1A, and spacing between channels, e.g., S depicted in FIG. 1A.

In some examples, electronic tests are employed to detect defects buried within three dimensional structures. However, multiple device layers must be fabricated before electronic tests are performed. Thus, defects cannot be detected early in the production cycle. As a result, electronic tests are prohibitively expensive to perform, particularly during research and development and ramp phases of the production process, where rapid assessment of defects is critical.

In some other examples, defects buried within three dimensional structures can be detected based on x-ray based measurement techniques. For example, an x-ray diffractive measurement system or a coherent x-ray imaging system may be employed to detect buried defects. X-ray based measurement techniques have the advantage of being non-destructive, but throughput remains quite low.

In some other examples, atomic force microscopy (AFM) can be used as a tapping and non-contact solution for defect inspection. Unfortunately, it is very difficult to locate the probe tip of an AFM system within a trench having a width of less than 10 nanometers. Attempts to probe within such narrow trench features leads to shortened probe tip lifetime and frequent tool maintenance. In addition, the scanning operational mode of an AFM system is extremely slow. As a result, the buried defect inspection capability of AFM at the dimensions of current GAA architectures is extremely limited.

Optical brightfield (BF) inspection is a wafer inspection technology that is widely deployed in modern semiconductor fabrication facilities. Optical BF inspection is a far-field inspection methodology having a large field-of-view and low-dose exposure that is commonly implemented in modern semiconductor fabrication facilities.

In some examples, an optical BF inspection system employs a broad band plasma (BBP) light source emitting light having wavelengths at 193 nanometers and lower. However, the penetration of light at these wavelengths to probe buried defects on patterned wafers is limited. This results in high noise and low image contrast, and thus limited capability to detect buried defects.

Other recent bright field technology, such as scanning near-field optical microscopy (SNOM), feature improved imaging resolution capability, e.g., resolution down to $\lambda/20$, where $\lambda$ is the wavelength of the illumination light. Unfortunately, similar to optical BF inspection modalities, SNOM illumination light is limited in its capability to penetrate to buried defects and requires precise depth of focus (DOF) positioning compared to conventional far-field microscopy.

In some other examples, buried defect inspection may be possible on 3D NAND flash memory devices using the epsilon-near-zero effect and hyperbolic Bloch mode formation by exploiting the inherent hyperbolic metamaterial structure of the device. Spectral analysis in the longer-wavelength infrared region shows clear hyperbolic guided-mode-resonance signatures that would potentially allow defect identification over the entire device depth and on the scale of multiple micrometers. The hierarchical structure of 3D NAND flash memory presents periodically coupled surface-plasmon modes, i.e., vertical Bloch modes, which are not available in logic GAA FET structures. Thus, this approach is not applicable to the detection of buried defects in GAA targets.

In summary, optical BF inspection systems suffer from penetration and resolution issues when attempting to detect buried defects adjacent to channel structures in GAA devices.

Electron beam inspection (EBI) is another wafer inspection technology deployed in modern semiconductor fabrication facilities. EBI technology, also known as scanning electron microscope (SEM) technology, can detect and characterize defects with feature sizes down to 1 nanometer on the surface of a sample.

In some other examples, electron beam inspection (EBI) is employed directly to detect defects buried within three dimensional structures. Back-scattered electrons can be employed to detect buried defects. Unfortunately, high electron landing energy is required to penetrate into the location of the buried defects and provide sufficient energy to allow backscattered electrons to escape from the defect area and return to the detector. Furthermore, back-scattered electrons produced by high landing voltage have limited resolution.

In practice, EBI is extremely limited in its ability to detect defects beyond a depth of approximately one micrometer. In many examples, EBI is limited to depths that are far less than one micrometer (e.g., less than fifty nanometers). This limitation is due to practical limits on electron dosage before sample distortion or destruction occurs. Thus, EBI is limited in its effectiveness as a defect detection tool for thick, three dimensional structures.

In addition, the ultra-small field of view of E-beam inspection limits its throughput, and thus prevents its implementation as an in-line, production measurement system. In an attempt to increase wafer throughput, multiple electron beam columns have been employed. However, even with multiple columns, EBI still suffers from throughput limitations.

Through-focus scanning optical microscopy (TSOM) is a conventional microscopy-based imaging technology. It allows conventional optical microscopes to collect dimensional information by combining 2D optical images captured at a series of through-focus positions. Through-focus images are stacked as a function of focus position, resulting in a 3D space containing optical information. From this 3D space, cross-sectional 2D TSOM images are extracted through the defect location of interest in any given orientation. Defect signals are obtained by subtracting the selected images including the defect from corresponding baseline TSOM images.

TSOM is generally regarded to have lateral and vertical measurement sensitivity of less than a nanometer. In some examples, TSOM measurement accuracy of nanodot and nanoparticle size structures has been demonstrated to be comparable with SEM if there is an acceptable quality database of TSOM images available.

TSOM includes analysis on large numbers of images. In some examples, this enables a reduction of optical cross correlations, e.g., correlation between linewidth and line height, which, in turn, reduces measurement uncertainty. In these examples, the reduction of cross-correlations overcomes a limitation of conventional optical based metrology tools.

The diffraction limit of conventional optical imaging systems is avoided using TSOM. In this manner, ordinary wide field optical microscopes can achieve dimensional measurement resolution at nanometer or sub-nanometer scale. TSOM has been demonstrated to be with sensitivity down to nanometer level for a wide variety of target materials and shapes from simple nanoparticles to complex semiconductor structures including grating line critical dimension, overlay, patterned defect detection and analysis, FinFETs, nanoparticles, photo-mask linewidth, thin-film thickness, through-silicon vias (TSVs), high-aspect-ratio (HAR) targets, etc.

However, the structural complexity and close spacing between channels of buried GAA structures limits the achievable sensitivity of a TSOM measurement to buried defects. Severe diffraction within the GAA structure makes defect detection complicated and inaccurate as it is difficult to isolate the measured defect from the impact of nearby structures. In addition, the optical interference among measurement channels and variation among the complicated structures surrounding the defect of interest within the GAA structure also contributes to detection inaccuracy. The variation of structures surrounding the defect of interest within the wafer, wafer-to-wafer, lot-to-lot and product-to-product generates inconsistency in the baseline reference. This results in unacceptable uncertainty in detection and metrology of defects buried within GAA structures.

In addition, it is challenging to identify illumination wavelengths and intensity to generate images with high signal to noise ratio at depths well beyond the defect location. Typically, only near IR or longer wavelength light has enough penetration depth into GAA transistor channels. Unfortunately, long wavelength illumination light is not desired due to the resulting limitations on image resolution.

In summary, the transition of semiconductor manufacturing to gate-all-around (GAA) architectures increases the number and types of potential defects that occur during fabrication as well as the difficulty of detecting these defects. Buried feature dimension measurement and buried defect inspection are challenging and solutions are required to meet process control goals in advanced semiconductor fabrication facilities. In general, defects in GAA structures, e.g., the defects depicted in FIGS. 1B-1E, are difficult to detect and have strained the capabilities of current defect inspection systems in terms of sensitivity, specificity, processing speed, and capture rate. Thus, wafer defect inspection and metrology systems for buried defects adjacent to device channels of GAA structures are desired to achieve consistent device performance and yield.

SUMMARY

Methods and systems for improved detection of defects of interest (DOI) and measurement of structures buried within complex three dimensional semiconductor structures are described herein. Through-focus scanning optical microscopy (TSOM) using non-linear, second harmonic generation (SHG) light signals emitted from a sample provides interface-selective sensitivity for metrology and inspection of structures fabricated in accordance with advanced semiconductor device manufacturing techniques. In this manner, metrology and defect inspection capability is enhanced in specific areas emitting SHG signals.

In one aspect, a TSOM/SHG measurement system stimulates and detects SHG signals emitted from a sample to characterize defects and dimensions of structures buried within complex semiconductor structures. TSOM microscopy based on images of detected SHG light is an interface-based defect inspection and metrology imaging apparatus. TSOM provides a focus scanning capability that is non-destructive and high throughput. SHG light signals provide a high resolution capability with reduced sensitivity to structural disturbances and structural variations around the interface area of interest. SHG microscopy acquires contrast images from variations in SHG signal production of the sample activated by the incident light.

In some examples, SHG light signals arise from material interfaces. In some of these examples, SHG light signals are sensitive to the properties of structures and defects adjacent to inversion-symmetric materials such as Silicon, and largely insensitive to matrix and background interference from surrounding structures and materials. Such measurements provide defect detection and measurement of structures based on their proximity to an inversion-symmetric material. Thus, in the context of measurements of structures and detection of defects buried in complex semiconductor structures, significant limitations of TSOM are minimized using SHG light signal imaging.

In some embodiments, a TSOM/SHG system includes a high intensity laser light source to penetrate into semiconductor samples and stimulate SHG light signals. In some embodiments, the laser light source is an intense wavelength tunable, pulsed laser, such as Ti-Sapphire laser or a Yb-KGW laser. In some embodiments, the range of wavelengths spanned by the laser illumination source extends from ultraviolet to near infrared wavelengths. In some embodiments, the laser light source generates illumination light as a time-series of pulses repeating at a repetition rate. In some examples, the illumination light has a pulse repetition rate in the kilohertz to megahertz range. Each pulse is characterized by a pulse duration, e.g., full width at half-maximum (FWHM) of the optical power versus time. In some examples, the illumination light has an ultrafast pulse duration, e.g., pulse duration measured on the order of picoseconds, femtoseconds, or attoseconds. In one example, the illumination light has a pulse repetition rate of less than 100 femtoseconds with an average optical power of at least one Watt. Ultrafast pulses provide high peak powers suitable for efficiently inducing SHG at surface interfaces buried deep in a semiconductor sample under measurement.

SHG emission occurs at half of the wavelength, i.e., twice the frequency, of the illumination wavelength at the location of energy combination. As such, the wavelength of a probe illumination beam is selected to be a relatively long wavelength to allow for deeper penetration into the sample without incurring a resolution penalty. In effect, the halving of wavelength inherent to SHG enables a doubling of illumination probe beam wavelength without a resolution penalty. In some embodiments, the wavelengths of the probe illumination beam are in a wavelength range beyond visible light to avoid the penetration limitations inherent to ultraviolet-visible light into typical semiconductor materials such as SiGe, polysilicon, etc.

In a further aspect, a TSOM/SHG measurement system includes an exogenous illumination source that generates exogenous illumination directed onto the sample under measurement to stimulate SHG signals. The exogenous illumination may generate charge separation at one or more interfaces of the structures under illumination, thereby inducing a DC electric field. The DC electric field may enhance SHG emission. In this manner, the strength of SHG generation and measurement sensitivity, e.g., at the interface of an inversion-symmetric material, such as Silicon, is enhanced by illumination from an exogenous illumination source.

In a further aspect, a TSOM/SHG measurement system includes an external electric field (E-field) source that generates an external electric field across the sample under measurement to stimulate SHG signals. In this manner, the strength of SHG generation and measurement sensitivity, e.g., at the interface of an inversion-symmetric material, such as Silicon, is enhanced by the changing electric field induced by the E-field source.

In a further aspect, a TSOM/SHG system includes a spectral filter in the collection optical path. The spectral filter blocks light at wavelengths corresponding to the illumination probe beam and external pump illumination beam, and passes collected light at wavelengths corresponding to the SHG emission within the sample under measurement. In this manner, the spectral filter separates the SHG collected light, which is at half the wavelength of the probe illumination light, from all other light collected from the sample, e.g., reflected or scattered light, and passes only SHG light onto the detector.

A TSOM/SHG system generates three dimensional images of a thick semiconductor structure from a volume measured in two lateral dimensions (e.g., parallel to the wafer surface) and a depth dimension (e.g., normal to the wafer surface). The outputs from the detector are arranged into a volumetric data set that corresponds to the measured volume.

In some embodiments, defects in a target structure are detected by comparing the target SHG images to reference SHG images. In one example, the defects are detected based on differences between the reference and target images. In other examples, defects are identified by comparing target SHG images and one or more simulated three-dimensional images of a defect. In some other examples, a measurement library is generated that matches measured data with defects measured by a trusted reference measurement system. In one example, the trusted reference measurement system is a defect review performed after focus ion beam etching of a specimen under consideration. Once the library is generated, defects associated with subsequent measurements are estimated based on library matching.

In a further aspect, defects are classified based on difference images derived from SHG images generated under different measurement conditions, i.e., different optical modes. In some examples, SHG images are generated using different properties of incident illumination, e.g., polarization, wavelength, angle of incidence, etc., different properties of exogenous illumination, e.g., different intensity levels, etc., different properties of an external E-field, e.g., different intensity, etc.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Figure 1A:
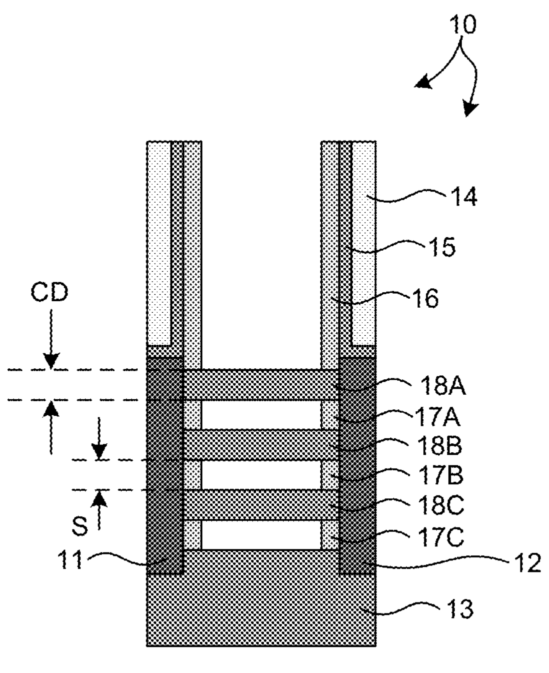
FIGS. 1A-1E are simplified illustrations of a GAA nanosheet device structure in various defect states after the GAA channel release process step.
Figure 1B:
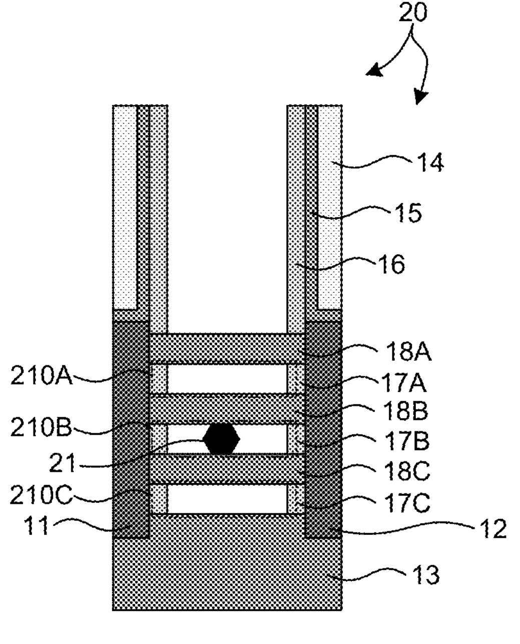
Figure 1C:
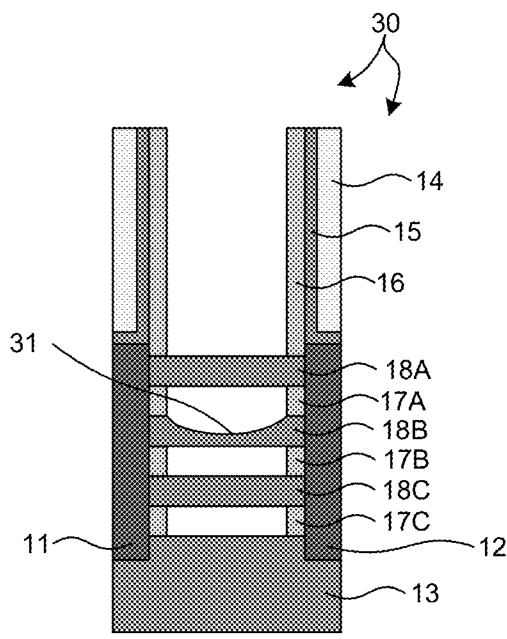
Figure 1D:
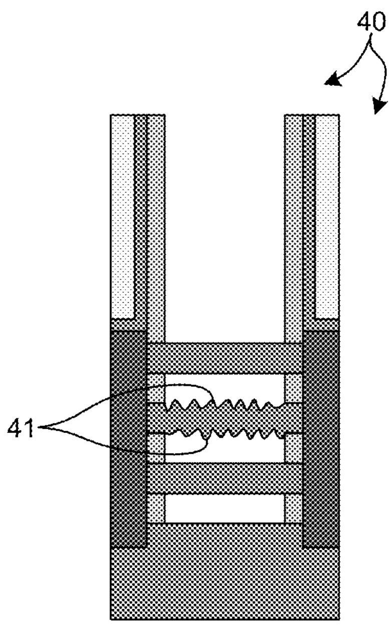
Figure 1E:
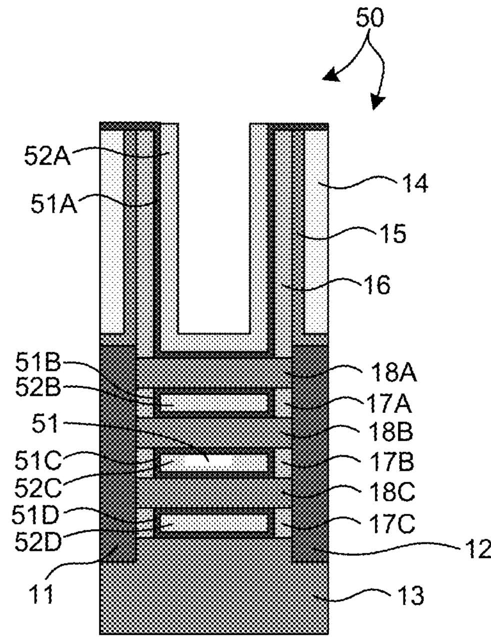

Reference will now be made in detail to background examples and some embodiments of the invention, examples of which are illustrated in the accompanying drawings.

Methods and systems for improved detection of defects of interest (DOI) and measurement of structures buried within complex three dimensional semiconductor structures are described herein. In particular, through-focus scanning optical microscopy (TSOM) using non-linear, second harmonic generation (SHG) light signals emitted from a sample provides interface-selective sensitivity for metrology and inspection of structures fabricated in accordance with advanced semiconductor device manufacturing techniques. In this manner, metrology and defect inspection capability is enhanced in specific areas emitting SHG signals. TSOM microscopy using SHG light signals is a small spot size, high throughput technique with in-line wafer inspection and metrology capability that is compatible with modern high volume manufacturing of semiconductor devices. Both design rule targets and actual device targets may be inspected and measured in accordance with the methods and systems described herein.

TSOM microscopy using SHG light signals is employed to measure structural dimensions and inspect defects around metal-oxide-semiconductor field-effect transistor (MOSFET) devices fabricated in accordance with many architectures, including, but not limited to, planar FET, FinFET, Gate-All-Around (GAA) nanosheet, fork-sheet and complementary nanosheet FET. In addition to MOSFET devices, TSOM microscopy using SHG light signals may be employed to measure structural dimensions and inspect defects around through-silicon vias (TSV), 3D Flash and 3D Dynamic Random-Access Memory (DRAM) memory, ferroelectric FET, 2-dimensional (2D) material-based FET devices with very thin, monolayers, used as its channel, source, drain and gate dielectric, ferroelectric thin film stacks including $HfO_2$ film layers doped with Zr, Al, Gd, La, Si, Sr and Y and multiple layers of $HfO_2$ with oxides of Zr, Al, Gd, La, Si, Sr and Y, such as $SiO_2/HfO_2/AlO_3$, $HfO_2/ZrO_2/HfO_2$, etc. By way on non-limiting example, defect types on 2D material-based FET device include film lattice mis-localization, etch residue, 2D channel strain and bending, and etch roughness.

By way of non-limiting example, TSOM microscopy using SHG light signals may be employed to measure structures and detect defects at various process steps of a GAA nanosheet manufacturing process, including, but not limited to, channel release etch remain defects, channel roughness, and channel shape after post channel release etch, high-K metal layer defects and metal gate layer defects after multiple steps in high-K, metal gate formation, post SiGe recess etch and inner spacer formation defects, and source/drain epitaxial defects after source/drain epitaxial growth steps.

Buried defect inspection and dimension metrology of patterned wafers is more complex and challenging than defect inspection and metrology at the wafer surface. The complex structural topography and various materials employed at various depths within a patterned wafer make defect and feature characterization difficult. TSOM reveals defects of interest at multiple depths through the structures under inspection at high throughput. Three dimensional optical inspection captures signal propagation within the wafer, and thus is able to differentiate real DOIs from nuisance and noise, even for relatively thick samples (e.g., 3D NAND wafers with a layered structure thicker than three micrometers).

Second harmonic generation (SHG) is a non-linear optical process in which two photons having the same wavelength interact with an optically non-linear material, combine energy, and generate a new photon with twice the energy and half the wavelength of the initial photons. SHG is non-destructive, and it has been used to characterize semiconductor surfaces and interfaces.

In general, the crystalline structure of silicon is diamond-cubic lattice which is inversion symmetric. As a result, electric field and polarization vectors in bulk silicon are invariant in the inversion system, and thus cannot display SHG. However, SHG can be generated from a higher-order nonlinear response from an inversion symmetric material. In one example, SHG can be generated from an electric dipole on a silicon surface. In another example, SHG can be generated from an electrical quadrupole response from bulk silicon stimulated by an externally applied electrical field. In these examples, inversion symmetry is broken along the normal direction at the silicon surface such that the second-order surface susceptibility at the interface is non-zero. The broken interface at the surface region enables SHG with high sensitivity to the extent of the broken inversion symmetry at the surface of the inversion symmetric material or at an interface with another material.

In one aspect, a TSOM/SHG measurement system stimulates and detects SHG signals emitted from a sample to characterize defects and dimensions of structures buried within complex semiconductor structures. TSOM microscopy based on images of detected SHG light is an interface-based defect inspection and metrology imaging apparatus. TSOM provides a focus scanning capability that is non-destructive and high throughput. SHG light signals provide a high resolution capability with reduced sensitivity to structural disturbances and structural variations around the interface area of interest. SHG microscopy acquires contrast images from variations in SHG signal production of the sample activated by the incident light, whereas conventional optical microscopy acquires contrast images, and variations in optical density, path length, or refractive index of the samples are detected from the contrast images.

TSOM/SHG provides a rich image data set at any location within deep, complex semiconductor structures, whereas TSOM images based on conventional light scattering are contaminated by matrix and background interference from surrounding structures and materials. As the complexity of the underlying structural topography increases, the problem worsens. In contrast, SHG signals arise under very specific structural conditions compared to conventional scattering. Thus, SHG signals are much more selective.

In some examples, SHG light signals arise from material interfaces. In some of these examples, SHG light signals are sensitive to the properties of structures and defects adjacent to inversion-symmetric materials such as Silicon, and largely insensitive to matrix and background interference from surrounding structures and materials. Such measurements provide defect detection and measurement of structures based on their proximity to an inversion-symmetric material. Thus, in the context of measurements of structures and detection of defects buried in complex semiconductor structures, significant limitations of TSOM are minimized using SHG light signal imaging.

TSOM microscopy using SHG light signals improves metrology and defect inspection of nanosheet GAA transistor channels and surrounding structures. In some examples, charge and trap characteristics at channel surfaces or interfaces give rise to SHG light signals that are sensitive to adjacent defects, surface roughness characteristics, surface erosion, changes in channel stress/strain, and channel structure characteristics such as bending and surface roughness, etc.

In some examples, TSOM measurements using SHG signals provide defect detection and measurement of structures based on their proximity to Silicon channels buried in semiconductor structures. SHG signals emitted at the interface of an inversion-symmetric material, such as Silicon, are highly sensitive to the presence of additional dipoles near the interface. In some examples, surface bonding between different materials will produce different SHG behavior. In one example, disilane or hydrogen is bonded to the surface of bulk Silicon during an epitaxial process step. SHG behavior at the interface depends strongly on the quality of the surface bonding. In one example, it has been observed that detectable variations in SHG intensity occur when the process pressure of hydrogen is varied from 0.8 to 1.5 Torr.

Figure 2:
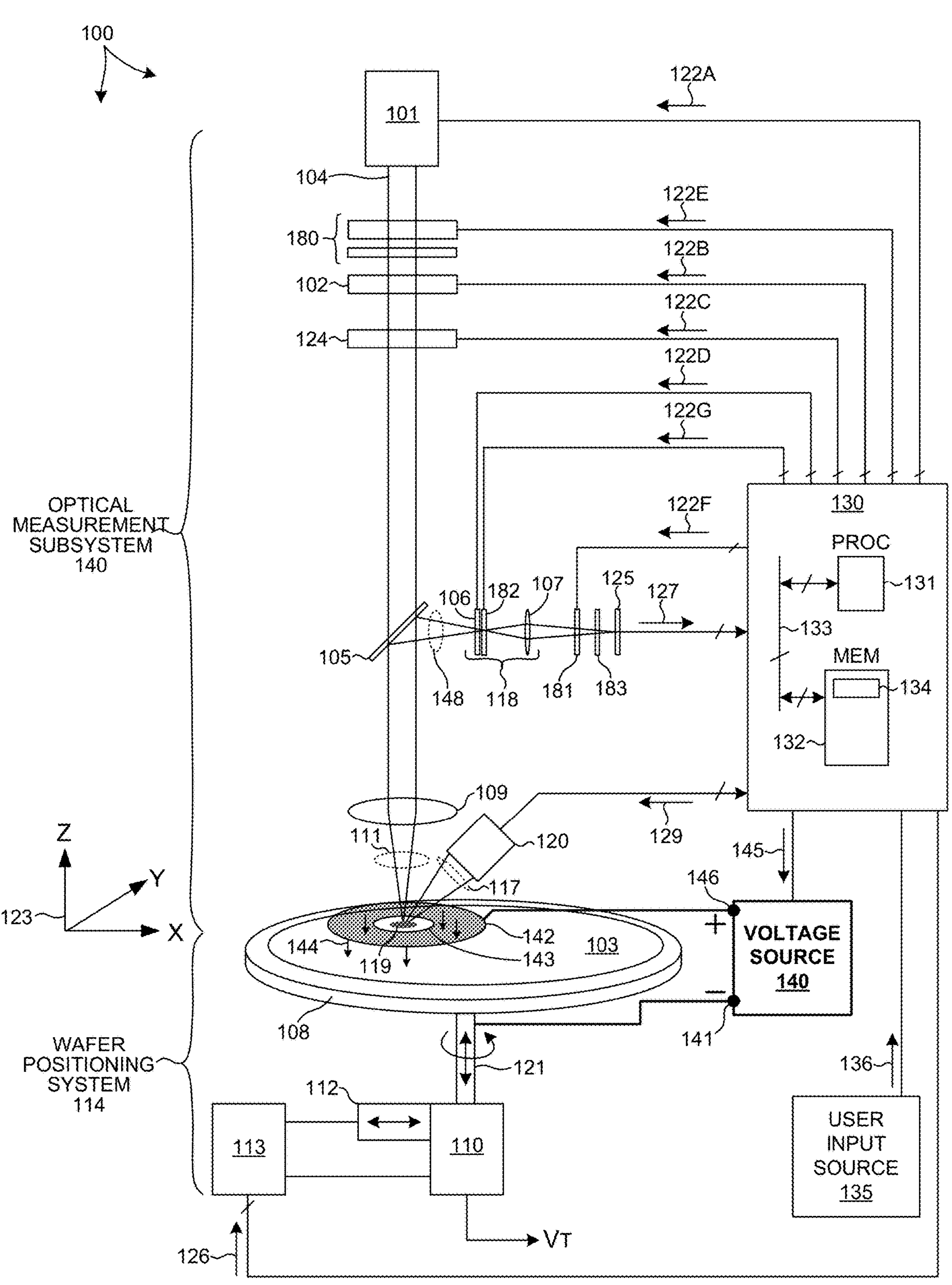
FIG. 2 is a simplified schematic view of an embodiment of a TSOM/SHG system configured to stimulate and detect SHG emission from buried semiconductor structures, and classify defects of interest (DOI), perform measurements, or both, based on the detected SHG images.

FIG. 2 is a simplified schematic view of an embodiment of a TSOM/SHG system 100 configured to stimulate and detect SHG emission from buried semiconductor structures, and classify defects of interest (DOI), perform measurements, or both, based on the detected SHG images. TSOM/SHG measurement system 100 includes a computing system, a wafer positioning system, and an optical measurement subsystem including an illumination subsystem, a collection subsystem, and one or more detectors. The illumination subsystem includes an illumination source 101 and all optical elements in the illumination optical path from the illumination source to the wafer. The collection subsystem includes all optical elements in the collection optical path from the specimen to each detector. For simplification, some optical components of the system have been omitted. By way of example, folding mirrors, polarizers, beam forming optics, additional light sources, additional collectors, and detectors may also be included. All such variations are within the scope of the invention described herein. The measurement system described herein may be used for inspection, metrology, or both, of patterned wafers and reticles.

Figure 3:
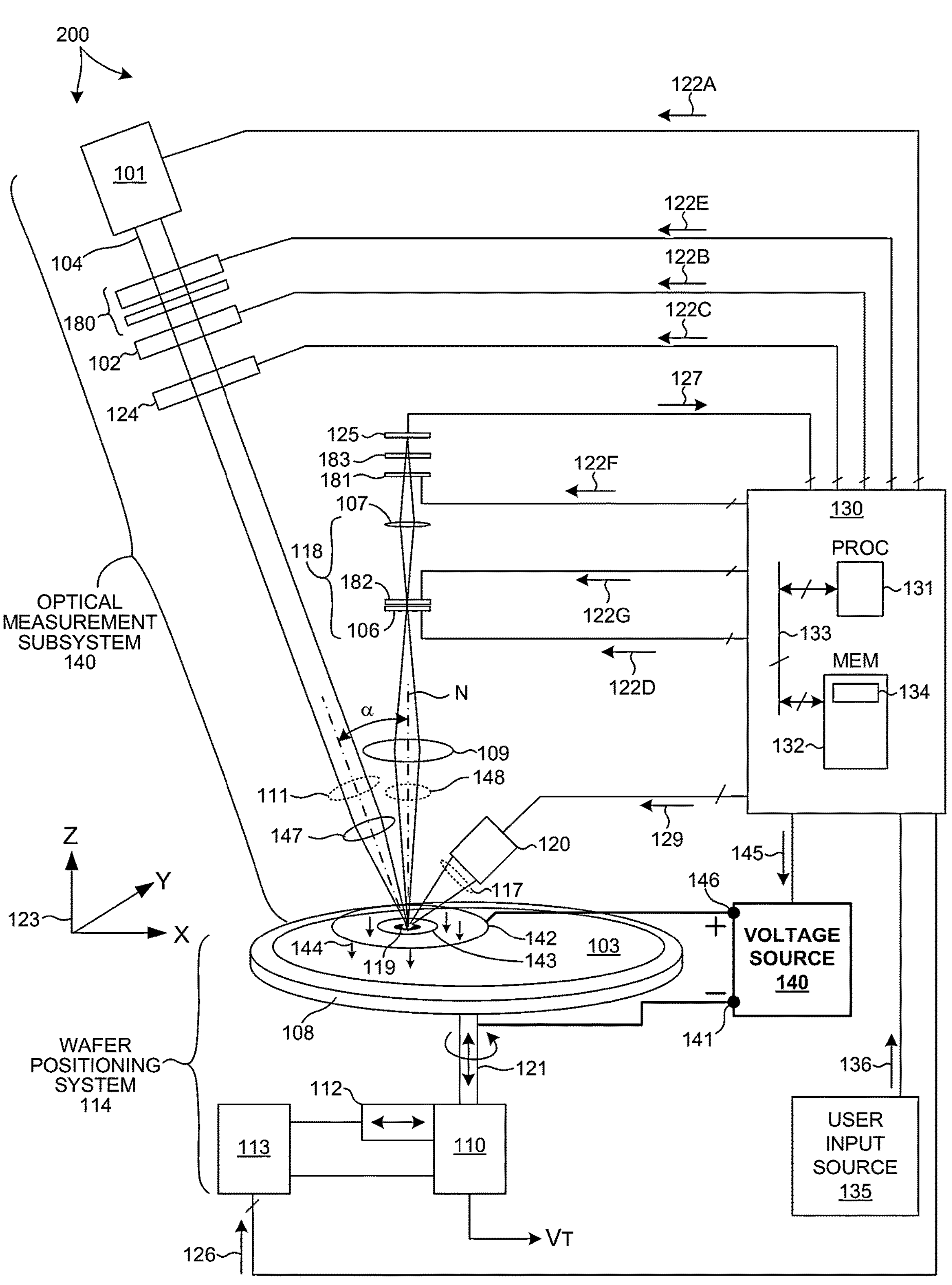
FIG. 3 is a simplified schematic view of another embodiment of a TSOM/SHG system configured to stimulate and detect SHG emission from buried semiconductor structures, and classify defects of interest (DOI), perform measurements, or both, based on the detected SHG images.

As illustrated in FIG. 2, a wafer 103 is illuminated by a normal incidence beam 104 generated by one or more illumination sources 101. Alternatively, the illumination subsystem may be configured to direct the beam of light to the specimen at an oblique angle of incidence as depicted in FIG. 3. In some embodiments, system 100 may be configured to direct multiple beams of light to the specimen such as an oblique incidence beam of light and a normal incidence beam of light. The multiple beams of light may be directed to the specimen substantially simultaneously or sequentially.

FIG. 3 is a simplified schematic view of an embodiment of a TSOM/SHG system 200 configured to stimulate and detect SHG emission from buried semiconductor structures, and classify defects of interest (DOI), perform measurements, or both, based on the detected SHG images. Like numbered elements depicted in FIG. 3 are analogous to those depicted in FIG. 2. As depicted in FIG. 3, illumination beam 111 is incident on wafer 103 at an oblique angle, a, i.e., an angle, a, with respect to an axis, N, normal to the surface of wafer 103. As depicted in FIG. 3, illumination beam 111 is focused onto wafer 103 by illumination focusing optics 147. Objective 109 collects SHG light 148 from wafer 103 as described with respect to FIG. 2.

Illumination source 101 may include, by way of example, a broad band laser sustained plasma light source, a laser, a supercontinuum laser, a diode laser, a helium neon laser, an argon laser, a solid state laser, a diode pumped solid state (DPSS) laser, a xenon arc lamp, a gas discharging lamp, an LED array, and an incandescent lamp. The light source may be configured to emit near monochromatic light or broadband light. In some embodiments, the illumination subsystem may also include one or more spectral filters that may limit the wavelength of the light directed to the specimen. The one or more spectral filters may be bandpass filters and/or edge filters and/or notch filters. Illumination may be provided to the specimen over any suitable range of wavelengths. In some examples, the illumination light includes wavelengths ranging from 260 nanometers to 950 nanometers. In some examples, illumination light includes wavelengths greater than 950 nanometers (e.g., extending to 2, 500 nanometers) to capture defects in high aspect ratio structures.

In some embodiments, a TSOM/SHG system includes a high intensity laser light source to penetrate into semiconductor samples and stimulate SHG light signals. In some embodiments, illumination source 101 is an intense wavelength tunable, pulsed laser, such as Ti-Sapphire laser or a Yb-KGW laser. In some embodiments, the range of wavelengths spanned by the laser illumination source extends from ultraviolet to near infrared wavelengths.

In general, illumination source 101 may be configured to generate illumination light 104 having any suitable temporal profile. In some embodiments, illumination source 101 generates illumination light 104 as a time-series of pulses repeating at a repetition rate. By way of non-limiting example, illumination light 104 has a pulse repetition rate in the kilohertz to megahertz range. Each pulse is characterized by a pulse duration, e.g., full width at half-maximum (FWHM) of the optical power versus time. By way of non-limiting example, illumination light 104 has an ultrafast pulse duration, e.g., pulse duration measured on the order of picoseconds, femtoseconds, or attoseconds. In one example, illumination light 104 has a pulse repetition rate of less than 100 femtoseconds with an average optical power of at least one Watt. Ultrafast pulses provide high peak powers suitable for efficiently inducing SHG at surface interfaces buried deep in a semiconductor sample under measurement.

As described hereinbefore, SHG emission occurs at half of the wavelength, i.e., twice the frequency, of the illumination wavelength at the location of energy combination. As such, the wavelength of a probe illumination beam, e.g., illumination beam 104, is selected to be a relatively long wavelength to allow for deeper penetration into the sample without incurring a resolution penalty. In effect, the halving of wavelength inherent to SHG enables a doubling of illumination probe beam wavelength without a resolution penalty.

In some embodiments, the wavelengths of the probe illumination beam are in a wavelength range beyond visible light to avoid the penetration limitations inherent to ultraviolet-visible light into typical semiconductor materials such as SiGe, polysilicon, etc.

In some embodiments, the wavelength of the probe illumination beam 104 is greater than 400 nanometers. In some embodiments the peak wavelength of the probe illumination beam is within a range between 770 and 810 nanometers. In this wavelength range, it is possible to penetrate deep into semiconductor structures. Furthermore, SHG emission at a Si/SiGe interface peaks at approximately 400 nanometers, and SHG emission occurs at half the wavelength of the probe illumination beam. Thus, probe illumination near 800 nanometers results in peak or near peak SHG emission at a Si/SiGe interface.

As depicted in FIG. 2, computing system 130 communicates command signal 122A to illumination source 101. In response, illumination source 101 adjusts the spectral range (s) of the illumination light 104. In general, the beam 111 that is incident on wafer 103 may differ from the illumination light 104 emitted by illumination source 101 in one or more ways, including polarization, intensity, size and shape, etc.

Beam 104 generated by illumination source 101 is directed to a beam splitter 105. Beam splitter 105 directs the beam to objective lens 109. Objective lens 109 focuses the beam 111 onto wafer 103 at incident spot 119. Incident spot 119 is defined (i.e., shaped and sized) by the projection of light emitted from illumination source 101 onto the surface of wafer 103.

In general, the illumination subsystem includes one or more optical elements to control parameters of the illumination beam 111 such as, but not limited to, intensity, peak wavelength, or more generally, spectral characteristics, polarization, spot size on wafer 103, angle of incidence on wafer 103, etc. Illumination optical elements may include, but are not limited to, one or more polarizers, one or more spectral filters, one or more spatial filters, or one or more apodizers, etc. Illumination optical elements may be located in the illumination optical beam path at any suitable location including, but not limited to, a pupil plane, a field plane, etc.

As depicted in FIG. 2, TSOM/SHG system 100 includes optional illumination aperture 124. As depicted in FIG. 2, computing system 130 communicates command signal 122C to illumination aperture 124. In response, illumination aperture 124 adjusts the illumination direction and beam shape provided onto the surface of the wafer 103. In one embodiment the illumination aperture 124 is an assembly that provides varied aperture shapes controlled by command signal 122C communicated from computing system 130.

In some embodiments, the illumination subsystem may also include one or more polarization optics to control the polarization of illumination light directed to the specimen. In the embodiment depicted in FIG. 2, TSOM/SHG system 100 includes selectable illumination polarization elements 180. In one example, computing system 130 communicates command signal 122E to illumination polarization elements 180. In response, illumination polarization elements 180 adjust the polarization of the illumination light provided onto the surface of the wafer 103.

In some embodiments, the probe beam 104 generated by a pulsed laser based illumination source is converted to linearly polarized, circularly polarized, or elliptically polarized light by polarization elements 180. The polarized illumination light is focused onto wafer 103. In some embodiments, polarization elements 180 may be configured to generate radial and azimuthal polarized light directed to wafer 103.

As depicted in FIG. 2, TSOM/SHG system 100 includes an optional illumination power attenuator 102 that controls the illumination power delivered to wafer 103. In some other embodiments, the illumination power density attenuator 102 is a beam shaping element that resizes the illumination spot 119 to reduce the illumination power density delivered to wafer 103. In some other embodiments, a combination of illumination power reduction and beam sizing is employed to reduce the illumination power density delivered to wafer 103. As depicted in FIG. 2, computing system 130 communicates a control signal 122B to illumination power attenuator 102 to control illumination power based on the three dimensional images detected by detector 125.

In some embodiments, TSOM/SHG system 100 may include a deflector (not shown) in the illumination path. In one embodiment, the deflector may be an acousto-optical deflector (AOD). In other embodiments, the deflector may include a mechanical scanning assembly, an electronic scanner, a rotating mirror, a polygon based scanner, a resonant scanner, a piezoelectric scanner, a galvo mirror, or a galvanometer. The deflector scans the light beam over the specimen. In some embodiments, the deflector may scan the light beam over the specimen at an approximately constant scanning speed.

In a further aspect, a TSOM/SHG measurement system includes an exogenous illumination source that generates exogenous illumination onto the sample under measurement to stimulate SHG signals from the sample. The exogenous illumination may generate charge separation at one or more interfaces of the structures under illumination spot 119, thereby inducing a DC electric field. The DC electric field may enhance SHG emission. In this manner, the strength of SHG generation and measurement sensitivity, e.g., at the interface of an inversion-symmetric material, such as Silicon, is enhanced by illumination from an exogenous illumination source.

FIG. 2 illustrates an exogenous illumination source 120 that generates exogenous illumination light 117 directed to wafer 103 over incident spot 119. Exogenous illumination source 120 may include, by way of example, a broad band laser sustained plasma light source, a laser, a supercontinuum laser, a diode laser, a helium neon laser, an argon laser, a solid state laser, a diode pumped solid state (DPSS) laser, a xenon arc lamp, a gas discharging lamp, an LED array, and an incandescent lamp. The light source may be configured to emit near monochromatic light or broadband light. In some embodiments, the illumination source may also include one or more spectral filters that may limit the wavelength of the light directed to the specimen. The one or more spectral filters may be bandpass filters and/or edge filters and/or notch filters. Illumination may be provided to the specimen over any suitable range of wavelengths. In some embodiments, exogenous illumination source 120 is a tunable pulsed laser source configured to generate illumination light 117 characterized by wavelengths in the ultraviolet wavelength region, visible wavelength region, or both.

As depicted in FIG. 2, computing system 130 communicates command signal 129 to exogenous illumination source 120 to control the intensity of illumination light 117 directed to wafer 103 at any desired level. In response, exogenous illumination source 120 generates illumination light 117 in accordance with the command signal 129. In some examples, exogenous illumination source 120 generates illumination light 117 directed to wafer 103 during the duration of time a measurement occurs. In some examples, exogenous illumination source 120 generates illumination light 117 in a time-dependent manner, e.g., on-off sequence at a specified frequency, that modulates SHG emission to enhance SHG intensity. In some examples, exogenous illumination source 120 generates illumination light 117 in a time-dependent manner that modulates SHG emission to improve measurement sensitivity, decrease signal to noise ratio, etc.

In a further aspect, a TSOM/SHG measurement system includes an external electric field (E-field) source that generates an external electric field across the sample under measurement to stimulate SHG signals from the sample. In this manner, the strength of SHG generation and measurement sensitivity, e.g., at the interface of an inversion-symmetric material, such as Silicon, is enhanced by the changing electric field induced by the E-field source.

FIG. 2 illustrates an external E-field source 142 that generates an external E-field 144 across wafer 103 in the vicinity of incident spot 119. In the embodiment depicted in FIG. 2, external E-field source 142 is a parallel plate capacitor structure, having an upper plate disposed above wafer 103 and a lower plate (not shown) disposed below wafer 103. As depicted in FIG. 2, the upper plate includes an aperture 143 that allows illumination light 111 to reach wafer 103 and SHG emission to reach objective 109 without obfuscation. Voltage source 140 includes voltage nodes 141 and 146. Voltage node 146 is electrically coupled to the upper plate of the parallel plate capacitor, and voltage node 141 is electrically coupled to the lower plate of the parallel plate capacitor.

As depicted in FIG. 2, computing system 130 communicates command signal 145 to voltage source 140. In response, voltage source 140 generates a voltage difference between voltage nodes 146 and 141, which, in turn, induces a corresponding E-field 144 perpendicular to wafer 103 in accordance with command signal 145. In this manner, the field strength of induced E-field 144 are accurately controlled by computing system 130.

In some examples, external E-field source 142 generates E-field 144 during the duration of time a measurement occurs. In some examples, external E-field source 142 generates E-field 144 in a time-dependent manner, e.g., on-off sequence at a specified frequency that modulates SHG emission to enhance SHG intensity. In some examples, external E-field source 142 generates E-field 144 in a time-dependent manner that modulates SHG emission to improve measurement sensitivity, decrease signal to noise ratio, etc.

E-field 144 induces SHG emission at structural interfaces, e.g., a Si/SiO2 interface. The E-field induced SHG emission is a third-order nonlinear process depending on the interaction between the electric field and incident photons. The DC electric field applied to a symmetry-broken surface enhances SHG emission by the contribution of third-order electric susceptibility induced by the externally applied electric field.

TSOM/SHG system 100 includes collection optics 118 to collect the SHG light emitted from wafer 103 and light scattered and/or reflected by wafer 103 and focuses the light onto detector array 125. Output signals 127 of detector 125 are communicated to computing system 130 for processing the signals and determining the presence of defects and their locations, metrology results, or both.

Collection optics 118 may be a lens, a compound lens, or any appropriate lens known in the art. Alternatively, collection optics 118 may be a reflective or partially reflective optical component, such as a mirror. In addition, although particular collection angles are illustrated in FIG. 2, it is to be understood that the collection optics may be arranged at any appropriate collection angle. The collection angle may vary depending upon, for example, the angle of incidence and/or topographical characteristics of the specimen.

In general, the collection subsystem includes one or more collection optical elements to control parameters of collected light such as, but not limited to, intensity, peak wavelength, or more generally, spectral characteristics, polarization, collection location on wafer 103, or angle of collection at wafer 103. For example, the collection optical elements may include, but are not limited to, one or more polarizers, one or more spectral filters, one or more spatial filters, or one or more apodizers. Collection optical elements may be located in the collection optical beam path at any suitable location including, but not limited to, a pupil plane, a field plane, etc.

As depicted in FIG. 2, TSOM/SHG system 100 includes an optional, selectable Fourier filter 106. Computing system 130 communicates command signals 122D to Fourier filter 106. In response, Fourier filter 106 adjusts the Fourier filtering properties of the Fourier filter (e.g., by changing the specific Fourier filter elements located in the collection beam path).

As depicted in FIG. 2, TSOM/SHG system 100 includes optional collection aperture 182. As depicted in FIG. 2, computing system 130 communicates command signal 122G to collection aperture 182. In response, collection aperture 182 adjusts the amount of light collected from the surface of the wafer 103 that is transmitted to the corresponding detector. In one embodiment the collection aperture 182 is an assembly that provides varied aperture shapes controlled by command signal 122G communicated from computing system 130.

In a further aspect, TSOM/SHG system 100 includes a spectral filter 183 in the collection optical path. Spectral filter 183 blocks light at wavelengths corresponding to the illumination probe beam 111 and external pump illumination beam 117, and passes collected light at wavelengths corresponding to the SHG emission within the sample under measurement. In this manner, spectral filter 183 separates the SHG collected light, which is at half the wavelength of the probe illumination light, from all other light collected from the sample, e.g., reflected or scattered light, and passes only SHG light onto detector 125.

In some embodiments, spectral filter 183 includes one or more spectral filters, e.g., dielectric filters, etc., such as, but not limited to, a bandpass filter to selectively pass SHG light, a band reject filter to selectively reject the spectrum of the incident illumination beam 111, or a low-pass filter (e.g., a low-pass wavelength filter) with a cutoff to block the spectrum of the incident illumination beam 111 and pass the spectrum of SHG light. As another example, spectral filter 183 may include a dispersive element to spectrally disperse light emanating from wafer 103 followed by a spatial filter to selectively pass SHG light.

In some embodiments, the collection subsystem may also include one or more polarization optics to control the polarization of collected light directed to the detector. In the embodiment depicted in FIG. 2, TSOM system 100 includes selectable collection polarization elements 181 in the collection optical path. In one example, computing system 130 communicates command signal 122F to collection polarization elements 181. In response, collection polarization elements 181 adjust the polarization of the collection light provided onto the active surface of detector 125. SHG light intensity at the detector is dependent on the polarization of the illumination probe beam 111 and non-centrosymmetric structure interface information including material composition and defect characteristics. In some embodiments, illumination polarization elements 180 and collection polarization elements 181, each include two polarizers and a waveplate. Thus, two polarizers and a waveplate are located in both the illumination optical path and the collection optical path. This configuration provides measurement flexibility to optimize the combination of polarizers and waveplate in both the illumination and collection optical paths to achieve optimal data collection.

Detector 125 generally functions to convert the collected SHG emission into electrical signals indicative of an intensity image of the SHG emission at the active surface of the detector. In general, detector 125 may include substantially any photodetector known in the art. However, a particular detector may be selected for use within one or more embodiments of the invention based on desired performance characteristics of the detector, the type of specimen to be inspected, and the configuration of the illumination. For example, if the amount of light available for inspection is relatively low, an efficiency enhancing detector such as a time delay integration (TDI) camera may increase the signal-to-noise ratio and throughput of the system. However, other detectors such as charge-coupled device (CCD) cameras, photodiodes, phototubes and photomultiplier tubes (PMTs) may be used, depending on the amount of light available for inspection and the type of inspection being performed. In at least one embodiment of the invention, a photomultiplier tube is used for detecting light scattered from a specimen. Each detector may include only one sensing area, or possibly several sensing areas (e.g., a detector array or multi-anode PMT).

In some embodiments, detector 125 includes a single-pixel device such as, but not limited to, a photodetector, an avalanche photodiode, or a photomultiplier tube. In some embodiments, detector 125 includes a multi-pixel device such as, but not limited to, a charge-coupled device (CCD) or a complementary metal-oxidesemiconductor (CMOS) device. In some embodiments, detector 125 includes a spectrometer suitable for measuring a spectrum of light emanating from wafer 103 in response to the incident illumination beam 111. In general, the TSOM/SHG system 100 may include any number or types of detectors 125. In this way, TSOM/SHG system 100 may more generally be suitable for additional measurements beyond SHG measurements such as, but not limited to, Raman spectroscopy or photoluminescence.

In the embodiment depicted in FIG. 2, TSOM/SHG system 100 is configured to operate in a bright field imaging mode. For example, in the detected embodiment, detector 125 generates a bright field image. As illustrated in FIG. 2, some amount of light scattered from the surface of wafer 103 at a narrow angle is collected by objective lens 109. This light passes back through objective lens 109 and impinges on beam splitter 105. Beam splitter 105 transmits a portion of the light to collection optics 118, which in turn focuses the light onto detector 125. In this manner a bright field image is generated by detector array 125. Collection optics 118 includes imaging lens 107 that images the light collected by objective lens 109 onto detector array 125. An aperture 182, Fourier filter 106, or both are placed at the back focal plane of objective lens 109.

However, in general, TSOM/SHG system 100 may be configured to operate in various imaging modes such as bright field, dark field, and phase contrast. The various imaging modes can be implemented by using different illumination apertures 124, collection apertures, Fourier filters 106, or combinations thereof. The configuration of the imaging mode, such as illumination direction or imaging collection solid angle, can be determined based on collected three-dimensional SHG images. U.S. Pat. Nos. 7,295,303 and 7,130,039, which are incorporated by reference herein, describe these imaging modes in further detail. In other embodiments, additional detectors are configured to generate dark field images by imaging light collected at larger field angles. U.S. Pat. No. 6,208,411, which is incorporated by reference herein, describes these imaging modes in further detail.

TSOM/SHG system 100 also includes various electronic components (not shown) needed for processing the SHG signals detected by detector 125. For example, system 100 may include amplifier circuitry to receive output signals from detector 125 and amplify those output signals by a predetermined amount and an analog-to-digital converter (ADC) to convert the amplified signals into a digital format suitable for use within processor 131. In one embodiment, the processor may be coupled directly to an ADC by a transmission medium. Alternatively, the processor may receive signals from other electronic components coupled to the ADC. In this manner, the processor may be indirectly coupled to the ADC by a transmission medium and any intervening electronic components.

In the embodiment illustrated in FIG. 2, wafer positioning system 114 moves wafer 103 under beam 111 based on commands 126 received from computing system 130. Wafer positioning system 114 includes a wafer chuck 108, motion controller 113, a rotation stage 110, translation stage 112, and z-translation stage 121. Z-translation stage 121 is configured to move wafer 103 in a direction normal to the surface of wafer 103 (e.g., the z-direction of coordinate system 123). Translation stage 112 and rotation stage 110 are configured to move wafer 103 in a direction parallel to the surface of wafer 103 (e.g., the x and y directions of coordinate system 123). In some other embodiments, wafer 103 is moved in the in-plane directions (e.g., x and y directions) by the coordinated motion of multiple translation stages.

Wafer 103 is supported on wafer chuck 108. In some embodiments, wafer 103 is located with its geometric center approximately aligned with the axis of rotation of rotation stage 110. In this manner, rotation stage 110 spins wafer 103 about its geometric center at a specified angular velocity, ω, within an acceptable tolerance. In addition, translation stage 112 translates the wafer 103 in a direction approximately perpendicular to the axis of rotation of rotation stage 110 at a specified velocity, $V_T$. Motion controller 113 coordinates the spinning of wafer 103 by rotation stage 110 and the translation of wafer 103 by translation stage 112 to achieve a desired in-plane scanning motion of wafer 103 within TSOM/SHG system 100. In addition, motion controller 113 coordinates the movement of wafer 103 by translation stage 121 to achieve a desired out-of-plane scanning motion of wafer 103 within TSOM system 100. In some embodiments, translation stage 121 is driven by piezoelectric actuators.

Wafer 103 may be positioned relative to the optical subsystems of TSOM/SHG system 100 in a number of different modes. In an inspection mode, wafer 103 is repeatedly scanned in the lateral directions (e.g., x-direction and y-direction) at each different z-position. In some of these embodiments, the position, orientation, or both, of one or more illumination optical elements is controlled to scan incident illumination beam 111 across the wafer 103, e.g., galvo mirrors coupled to an f-theta lens.

In some examples, wafer 103 is scanned at two or more different z-positions, corresponding to two or more depths (e.g., distance below wafer surface) through a layered structure. In a metrology mode, wafer 103 is positioned in a fixed position in the x-direction and y-directions, while scanning in the z-direction. In this manner, three dimensional images are generated based on measurement data at a fixed lateral position of wafer 103 over a range of depths within the structure under measurement. Metrology mode is typically employed to perform more detailed investigation of defects (e.g., higher image resolution, higher focal depth resolution, or both).

In some embodiments, the wafer is moved to a number of different z-positions with respect to the focal plane of the TSOM/SHG system to image different depths of the wafer stack. In some other embodiments, the position of the focal plane of the TSOM/SHG system is adjusted optically to a number of different z-positions with respect to the wafer to image different depths of the wafer stack. In some embodiments, the objective, e.g., objective 109, and any focus lens disposed in the illumination and collection paths, e.g., illumination focus lens 147 are moved to adjust the position of the focal plane of the TSOM/SHG system with respect to wafer 103. In some embodiments, a deformable mirror may be employed to adjust the position of the focal plane of the TSOM/SHG system with respect to wafer 103.

In general, the optical subsystem 140, including both the illumination and collection subsystems, generates a focused optical image at each of a plurality of focus planes located at a plurality of different depths of a structure under measurement (e.g., a vertically stacked structure). The alignment of the focus plane of the optical subsystem at each different depth is achieved by optical adjustment that moves the focus plane in the z-direction, specimen positioning in the z-direction, or both. One or more detectors detect the light collected at each of the plurality of different depths and generate a plurality of output signals indicative of the amount of light collected at each of the plurality of different depths. The images collected at each focus position are aggregated to form a three dimensional volume image of a thick semiconductor structure measured in two lateral dimensions (e.g., parallel to the wafer surface) and a number of different depths (i.e., different z-positions).

TSOM/SHG system 100 generates three dimensional images of a thick semiconductor structure from a volume measured in two lateral dimensions (e.g., parallel to the wafer surface) and a depth dimension (e.g., normal to the wafer surface). In the embodiment depicted in FIG. 2, computing system 130 arranges the outputs from one or more of the measurement channels (e.g., from detector 125) into a volumetric data set that corresponds to the measured volume.

In a metrology example, a series of images are acquired at the same (x,y) location for a number of different wafer locations within the focal plane of the TSOM/SHG system. In this example, computing system 130 generates a three-dimensional image of the measured volume by assembling a stack of the series of two-dimensional images acquired at each different focus offset. Focus offset is the relative distance between the most reflective surface of the specimen and the focal plane of the TSOM/SHG system. In general, the parameter to be scanned is not limited to the focus offset. In other examples, sensor axial position, spectral band, illumination direction, etc., can be scanned to form a three-dimensional defect image. In some embodiments, a defect image having more than three dimensions is generated by computing system 130. In one example, both focus offset and illumination direction are scanned for a given (x,y) location. In one example, computing system 130 generates a four dimensional image of the measured volume by assembling the series of two-dimensional images acquired at each different focus offset and each different illumination angle into a fourth order tensor. In some examples, a series of images for a predefined set of focus offsets is collected while keeping illumination intensity and other system parameters unchanged.

In an inspection example, a series of images are acquired at various (x,y) locations for a number of different wafer locations within the focal plane of the TSOM/SHG system. To generate three dimensional images, image misalignment between different focus offsets must be minimized. In some examples, this is achieved by collecting data with the wafer stage accurately positioned for different depth measurements. However, this approach may significantly reduce throughput. In some other examples, images corresponding to the same lateral positions at different focus offsets are aligned after data collection using alignment targets.

In general, a three-dimensional image is processed algorithmically to identify and classify defects of interest or estimate values of one or more parameters of interest characterizing a structure under measurement. In some examples, processor 131 is configured to detect and classify defects from a three-dimensional image. The processor may include any appropriate processor known in the art. In addition, the processor may be configured to use any appropriate defect detection and classification algorithm or method known in the art. For example, the processor may use a target image to reference image comparison, e.g., a target image to another wafer target image or a target image to another wafer reference image, a target image to simulated image comparison, e.g., library matching with a simulated image library, a three-dimensional filter, a clustering algorithm such as a principal component analysis or spectral clustering, a thresholding algorithm, a deep learning algorithm, or any other suitable algorithm to detect and classify defects based on features extracted from target images, a deep learning algorithm, or any other suitable algorithm to detect and classify defects directly from target images. As a non-limiting illustration, any of the defects depicted in FIGS. 1B-1E may be identified and classified based on any suitable technique using images of SHG light signals captured by a TSOM system.

In some embodiments, one or more reference structures are illuminated by incident illumination beam 111 and SHG light is collected in response. One or more images of the collected SHG light (TSOM/SHG images) are detected by detector 125. The reference structures include one or more inversion-symmetric materials, and collected SHG light is associated with one or more interfaces between the one or more inversion-symmetric materials and additional features of the one or more reference structures. In some embodiments, the reference structure is known to be free from defects of interest. In some embodiments, a reference image is generated based on a combination, e.g., average, of multiple images of one or more reference structures on the same or different wafers.

In addition, one or more target structures are illuminated by incident illumination beam 111 and SHG light is collected in response. One or more images of the collected SHG light are detected by detector 125. The target structures include one or more inversion-symmetric materials, and collected SHG light is associated with one or more interfaces between the one or more inversion-symmetric materials and additional features of the one or more target structures. In general, the one or more target structures are nominally the same structures as the one or more reference structures, i.e., the variation between the target and reference structures is due to process variation, rather than nominal design differences.

In some embodiments, defects in the target structure are detected by comparing the target TSOM/SHG images to the reference TSOM/SHG images. In one example, the defects are detected based on differences between the reference and target images. It is contemplated that the reference and target TSOM/SHG images may differ based on acceptable variations of the reference and target structures within fabrication tolerances. However, it is further contemplated that defects in the target structure are identified by measurable differences between the reference and target images.

In other examples, defects are identified by comparing target TSOM/SHG images and one or more simulated three-dimensional images of a defect. In one example, computing system 130 performs a rigorous coupled wave analysis (RCWA) to simulate the measured defect response. This analysis may be performed recursively to minimize the error between the measured response and the simulated response and identify the defect.

In some other examples, a measurement library is generated that matches measured data with defects measured by a trusted reference measurement system. In one example, the trusted reference measurement system is a defect review performed after focus ion beam etching of a specimen under consideration. Once the library is generated, defects associated with subsequent measurements are estimated based on library matching.

In a further aspect, the three dimensional image is filtered before defect analysis to improve SNR. In some examples, computing system analyzes the assembled three-dimensional image with a 3D digital filter, or other suitable numerical technique to detect unique three-dimensional structures arising from defects. This effectively increases the SNR of the defects and enables more effective separation of defects of interest from noise or nuisance effects.

In some embodiments, defects are classified based on difference images derived from TSOM/SHG images generated under different measurement conditions, i.e., different optical modes. In some examples, TSOM/SHG images are generated using different properties of incident illumination beam 111, e.g., polarization, wavelength, angle of incidence, etc., different properties of exogenous illumination 117, e.g., different intensity levels, etc., different properties of external E-field 144, e.g., different intensity, etc.

Different defect types impact SHG light generation under different measurement conditions. In these embodiments, the differences are exploited to detect and classify the defects. In addition, difference images may be used with any classification technique including the use of design data, the use of defect depth information, pattern recognition techniques, machine learning techniques, or any combination thereof.

In some examples, a difference image may be generated by subtracting a first TSOM/SHG image generated with incident illumination beam 111 at a first wavelength and a second TSOM/SHG image generated with incident illumination beam 111 at a second wavelength. Further, a reference difference image and a target difference image may be generated by subtracting first and second reference TSOM/SHG images as well as subtracting first and second target TSOM/SHG images, respectively. In this way, defects may be identified based on a comparison of the reference and target difference images as described hereinbefore.

In some embodiments, defects are classified based on design data of a structure being inspected. For example, defect locations in target TSOM/SHG images or comparison images between reference and target TSOM/SHG images may be correlated to specific features based on the design data that may include intended layouts at the relevant process step at which the images were generated. Such information may then be used to classify defects based on known defect mechanisms in the associated regions at the associated process step. Further, depth information provided based on the wavelength or combination of wavelengths used to generate the images as described previously herein may be used to further isolate the location of the defects in three dimensions to facilitate classification (e.g., based on the known defect mechanisms in the associated regions at the associated process step).

In some embodiments, defects are classified based on patterns (e.g., pattern recognition) in the target TSOM/SHG images or comparison images between reference and target TSOM/SHG images. For example, multiple defects of different types may appear in a common region of a target TSOM/SHG image. Such defects may induce different variations of the SHG light emitted from proximate inversion-symmetric material interfaces. More particularly, different defect types may have different impacts on electric dipoles associated with the generation of SHG light at such interfaces based on differences in surface structure of the interface, composition of the associated materials, material thickness, etc. As a result, different defect types may generate identifiable patterns suitable for classification. Further, if multiple wavelengths are used as described previously herein, different defect types may generate patterns in one or more difference images, which may be used for defect classification.

In some embodiments, defects are classified using supervised or unsupervised machine learning techniques. For example, a supervised machine learning algorithm may be trained on any combination of reference TSOM/SHG images, target TSOM/SHG images of samples with known defects, comparison images (e.g., images generated by subtracting reference and test SHG images), difference images associated with different measurement parameter setting, etc. Subsequently, the trained supervised machine learning algorithm may classify defects identified on new test structures using the corresponding input images of the type used for training but generated from the new test structures. As another example, unsupervised machine learning techniques may identify defects directly based on analysis of any such inputs generated from any test structure.

TSOM images of SHG signals (TSOM/SHG images) emitted from deep, complex semiconductor structures include a minimum of matrix or background interference because the measured signals capture structure details at interfaces only, e.g., around nanosheet GAA transistor channel structures, etc. Since many defects in GAA nanosheet transistor fabrication are close to the FET channel area, TSOM/SHG images may be used to monitor devices under fabrication at many different process steps and implement yield control of the fabrication process based on TSOM/SHG measurement results to control FET transistor performance and yield.

FIG. 1A illustrates SHG emitting regions 210A-C associated with three channels of a GAA nanosheet transistor. The interface or surface difference with and without etch remaining defect 21 after channel release etch is reflected in different TSOM/SHG images collected from GAA nanosheet device structure 10 depicted in FIG. 1A and GAA nanosheet device structure 20 depicted in FIG. 1B. Similarly, the interface or surface difference with and without channel erosion defect 31 after channel release etch is reflected in different TSOM/SHG images collected from GAA nanosheet device structure 10 depicted in FIG. 1A and GAA nanosheet device structure 30 depicted in FIG. 1C. Similarly, the interface or surface difference with and without surface roughness defect 41 after channel release etch is reflected in different TSOM/SHG images collected from GAA nanosheet device structure 10 depicted in FIG. 1A and GAA nanosheet device structure 40 depicted in FIG. 1D. Similarly, the interface or surface difference with and without void defect 51 after deposition of high-K dielectric layers 51A-D and metal gate layers 52A-D is reflected in different TSOM/SHG images collected from GAA nanosheet device structure 10 depicted in FIG. 1A and GAA nanosheet device structure 50 depicted in FIG. 1E.

In general, defects in other nanosheet GAA device process steps including SiGe recess etch and source/drain EPI growth may be detected based on TSOM/SHG images. For the EPI growth process, detectable defects include an over-inner-spacer defect, source/drain under-fill, voids and non-merged defects, HKMG void defects, etc. Defects in ferroelectric layers in Ferroelectric FET and 2D layers in 2D FET device may be detected based on TSOM/SHG images as well.

In general, defects are detected from three dimensional images by applying a defect detection algorithm. In some embodiments, defect detection is performed directly from image data generated by TSOM/SHG system 100. In some embodiments, one or more feature vectors are extracted from the collected image data and defect detection is performed based on the measured feature vectors. In general, a feature vector is an n-dimensional vector of numerical features that represent an object (e.g., defect of interest, nominal structure, etc.). In some examples, a defect detection algorithm includes one or more selectable threshold values that adjust the sensitivity of the defect detection algorithm. When highly restrictive threshold values are selected, the defect detection algorithm detects fewer defects of interest from a set of three dimensional images. When highly permissive threshold values are selected, the defect detection algorithm detects more defects of interest from the same set of three dimensional images. It is likely that real defects will be missed if too few defects are detected, and many nuisance (e.g., false) defects will be captured if too many defects are detected. Thus, an optimized measurement recipe tuned to a particular measurement application also includes a selection of detection algorithm threshold values that maximizes the capture rate of real defects, while minimizing the capture rate of nuisance (i.e., false) defects.

As described with respect to FIG. 2, computing system 130 generates and communicates command signals 122A-G such that illumination power, illumination apertures, collection apertures, spectral band, Fourier filters, illumination polarization, collection polarization, or any combination thereof, are selected in accordance with a specified optical mode. In addition, a measurement system such as TSOM/SHG system 100 includes other selectable optical system settings such as angle of incidence, azimuth angle, etc. Each distinct combination of optical system settings is referred to as a distinct optical mode of TSOM/SHG system 100. In particular, images generated by a TSOM/SHG system are sensitive to polarization, e.g., single polarization, multiple polarizations, or difference images among different polarizations, waveplate selection, probe beam wavelength, use of exogenous illumination light, use of external electric field, etc.

In practice, a TSOM/SHG measurement system, such as TSOM/SHG system 100 described herein, offers over 10,000 different optical modes, and one mode from thousands of possible modes must be selected to achieve one or more performance objectives. Exemplary performance objectives include, but are not limited to minimizing the response of the nominal structure in the three dimensional image, enhancing the response of the defect signal in the three dimensional image, minimizing the response of wafer noise or nuisance signals in the three dimensional image, discriminating the response of the defect from wafer noise or the nuisance signals in three dimensional images, improving the accuracy of estimated physical location of the defect from the three dimensional image, or any combination thereof. Thus, an optimized measurement recipe for a particular measurement application includes a selection of the optimal optical mode.

As described hereinbefore, measurement recipe optimization for a three dimensional optical system such as TSOM/SHG system 100 includes a selection of an optimal optical mode from thousands of possible system configurations and a selection of detection thresholds. The fact that DOIs may be present throughout the depth of a three dimensional semiconductor structure presents significant practical challenges for defect discovery and recipe optimization because the amount of available image data is so vast (i.e., three dimensional images, not just two dimensional images) and defect verification is so time consuming (i.e., wafer deprocessing is required to verify defects).

In one aspect, the three dimensional volume of a semiconductor wafer subject to defect discovery and verification is reduced by storing images associated with a subset of the total depth of the semiconductor structures under measurement. In this manner, the amount of image data that must be collected and analyzed as part of the measurement recipe optimization process is reduced.

In some examples, a TSOM/SHG measurement system receives values of one or more parameters corresponding to an initial TSOM/SHG measurement recipe.

In the embodiment depicted in FIG. 2, information about the measurement application 136 under consideration is received by computing system 130 from a user input source 135. Typically, the user input source 135 is an entity such as a user or operator having knowledge of the structures under inspection and expected defects. By way of non-limiting example, structural information 136 includes expected stack depth of defect of interest, wafer level signature of defect of interest, refractive index of the 3-D stack, etc. In one embodiment, TSOM system 100 includes peripheral devices useful to accept inputs from an operator (e.g., keyboard, mouse, touchscreen, communication ports, etc.) to communicate structural information 136 from the user to TSOM/SHG system 100.

A user also communicates an initial set of optical modes for TSOM/SHG system 100. A user of TSOM/SHG system 100 typically performs preliminary modeling or employs past experience to arrive at an initial set of optical modes of TSOM/SHG system 100, which are most likely to result in the best measurement results. Typically, an initial set of optical modes includes values of parameters corresponding to tens of different optical modes, but far fewer than the thousands of available optical modes. In some examples, a user also communicates one or more initial focus levels to TSOM/SHG system 100. The one or more initial focus levels include focus levels where defects of interest should be located. In some examples, a user communicates values of parameters characterizing an initial measurement recipe including properties of illumination beam 104 such as, but not limited to, intensity, wavelength, polarization, spot size on wafer 103, incidence angle on wafer 103, etc. In some examples, a user communicates values of parameters characterizing an initial measurement recipe including properties of collected SHG light 148 such as, but not limited to, the polarization. In some examples, a user communicates values of parameters characterizing an initial measurement recipe including properties of detector 125 such as, but not limited to, gain settings. In some examples, a user communicates values of parameters characterizing an initial measurement recipe including properties of spectral filter 183 such as, but not limited to, cut-off wavelength, band-pass wavelengths, etc. In some examples, a user communicates values of parameters characterizing an initial measurement recipe including properties of exogenous illumination source 120 such as, but not limited to, intensity, wavelength, polarization, spot size on wafer 103, incidence angle on the wafer 103, etc. In some examples, a user communicates values of parameters characterizing an initial measurement recipe including properties of external E-field source 142 such as, but not limited to, electric field strength, angle with respect to the wafer 103, etc.

In some examples, a TSOM/SHG measurement system performs measurements of one or more semiconductor structures based on the values of one or more parameters corresponding to the initial TSOM/SHG measurement recipe.

In response to user inputs 136, TSOM/SHG system 100 performs measurements of wafer 103 at each of the initial set of optical modes and at each of the one or more initial focus levels. Typically, the inspections are run in a scanning mode, where a large area of the wafer (e.g., the entire area of the wafer) is inspected at each of the one or more initial focus levels. Threshold values of the defect detection algorithm employed during the initial inspections set at highly permissive values that identify many defects (i.e., both real and nuisance defects).

After performing the initial inspections, computing system 130 selects a few of the most promising defects identified in the initial inspections. The most promising defects are defects of interest that most closely match the expected defects provided by the user of TSOM/SHG system 100. TSOM/SHG system 100 performs a through focus review of the selected defects of interest by locating the wafer 103 with respect to optical inspection subsystem 140 such that a selected defect of interest is in the field of view of TSOM/SHG system 100. A series of measurements are performed at a number of focus levels all the way through the structure under measurement. Based on the results of the through focus review, computing system 130 determines one or more focus planes or focus range that best capture the defect of interest. In some examples, the one or more focus planes or focus range is determined based on a best match between a measured defect signature (e.g., image or feature vector) and an expected defect signature.

After determining the one or more focus planes or focus range, TSOM/SHG system 100 records image patches associated with defect locations identified in each of the initial inspections at the one or more focus planes or focus range, rather than throughout the entire depth of the structure. In some examples, one hundred million defect locations, or more, are imaged at multiple focus levels, and recorded. In this manner, the amount of recorded data associated with defect discovery is limited to a subset of depths. The recorded data are employed during subsequent defect verification and recipe optimization processes. By limiting the amount of recorded data, subsequent defect verification and recipe optimization processes are dramatically simplified.

In a further aspect, the number of optical modes under consideration is reduced based on a comparison of one or more measured wafer level defect signatures and one or more expected wafer level defect signatures. In one example, after performing the initial inspections, computing system 130 selects a few of the most promising optical modes for further consideration (e.g., five or fewer optical modes). In one example, computing system 130 varies defect detection algorithm threshold values for each optical inspection mode. Computing system 130 varies the threshold values to best match a measured wafer level defect signature with an expected wafer level defect signature for each optical mode. In one example, a wafer level defect signature is a wafer defect map that illustrates regions of the wafer area where defects are more highly or less highly concentrated. In general, a wafer level defect signature includes any indication of wafer defects expressed across the entire wafer area under inspection.

The optical modes that best match the expected defect signature are selected for further consideration, and the other optical modes are discarded. In this manner, the number of modes selected for recording, as described hereinbefore, is reduced. Thus the amount of inspection data under consideration during subsequent defect verification and recipe optimization processes is further reduced. In some examples, five or fewer optical modes are selected for further consideration based on wafer level signature analysis.

In another further aspect, the number of optical modes under consideration is reduced based on measured defect signal to noise ratio. In one example, after performing the initial inspections and wafer level signature matching, computing system 130 further selects a few of the most promising optical modes for further consideration (e.g., three or fewer optical modes). In one example, computing system 130 analyzes the signal to noise ratio associated with each selected optical mode at the one or more focus planes or focus levels. Computing system 130 selects the optical modes with the highest signal to noise ratio for further consideration, and the other optical modes are discarded. In this manner, the number of modes selected for recording, as described hereinbefore, is reduced. Thus the amount of inspection data under consideration during subsequent defect verification and recipe optimization processes is further reduced. In some examples, three or fewer optical modes are selected for further consideration based on wafer level signature analysis.

In some examples, a TSOM/SHG measurement system performs measurements of one or more semiconductor structures based on the values of one or more parameters corresponding to the selected TSOM/SHG measurement recipes.

In some examples, defects are identified based on reference and test TSOM/SHG images generated using the selected values of TSOM/SHG system parameters associated with each selected TSOM/SHG measurement recipe. In other examples, defects are identified based on image differences associated with different optical modes, comparison to simulated images, library matching, etc., as described hereinbefore.

In another further aspect, the number of optical modes under consideration is reduced based on SEM review. Computing system 130 receives an indication of defects verified by the SEM review tool and selects the optical modes with the highest capture rates of verified defects, and the fewest capture rate of nuisance defects, for further consideration. Other optical modes are discarded. In this manner, the number of modes selected for recording, as described hereinbefore, is reduced. Thus the amount of inspection data under consideration during subsequent defect verification and recipe optimization processes is further reduced. In some examples, three or fewer optical modes are selected for further consideration based on wafer level signature analysis.

In some examples, a reference system performs measurements of the one or more semiconductor structures measured by the TSOM/SHG measurement system to verify whether defects are correctly identified. In some examples, a tunneling electron microscope (TEM), a SEM, a TSOM microscope, an optical bright field imaging microscope are employed to validate identified defects.

In some examples, the differences between the defects identified by the TSOM/SHG measurement system associated with each different measurement recipe are compared to the defects verified by the reference measurement system. If the differences are less than a predetermined threshold value, e.g., threshold value of percentage of defects correctly identified, the measurement recipe is employed for in-line production measurements. If the differences are greater than a predetermined threshold value, the measurement recipe is updated, TSOM/SHG measurements are performed in accordance with the updated measurement recipe, and the results are evaluated.

In another aspect, verified defect images/features are mapped to corresponding defects identified by TSOM/SHG system 100. The verified defects and the recorded three dimensional images are employed to train a nuisance filter and further optimize the measurement recipe.

Figure 4:
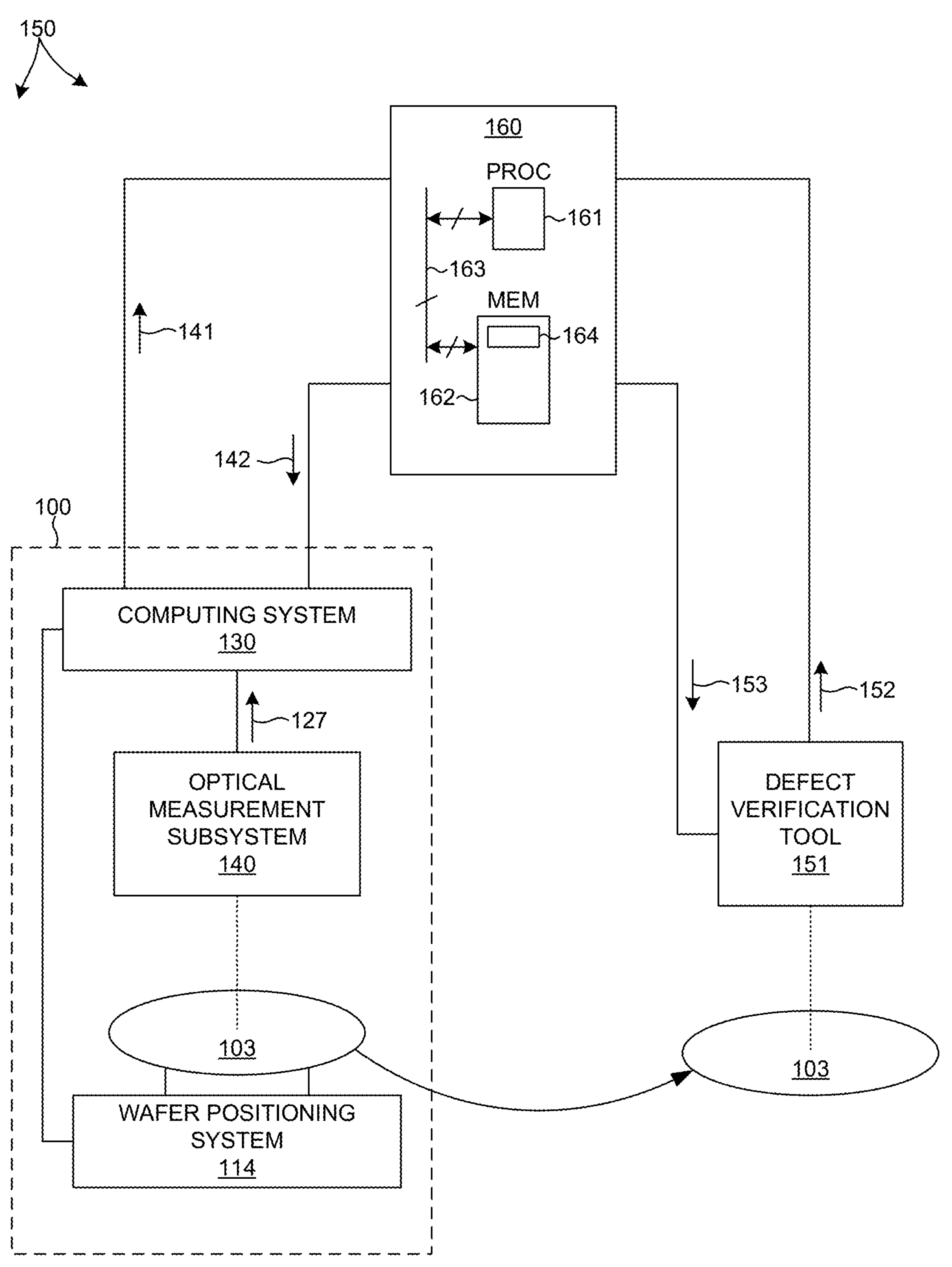
FIG. 4 is a simplified schematic view of one embodiment of a system for defect discovery and measurement recipe optimization for inspection of three dimensional semiconductor structures.

FIG. 4 is a simplified schematic view of one embodiment of a system 150 for defect discovery and measurement recipe optimization for inspection of three dimensional semiconductor structures. The system 150 includes TSOM/SHG system 100 as described with reference to FIG. 2, a defect verification tool 151, and a computing system 160. In some embodiments, the task performed by computing system 160 are as described herein are implemented by computing system 130, or another computing system.

In some embodiments, defect verification tool 151 is an electron beam based analysis tool. In some other embodiments, defect verification tool 151 is an x-ray based analysis tool. In these embodiments, a material removal tool may not be necessary to make the buried defect visible to the x-ray based analysis tool. Thus, an associated material removal tool is optional.

In some examples, defect verification is achieved by de-processing wafer 103 and inspecting the exposed defects with TSOM/SHG system 100. In these examples, a different defect verification tool 151 may not be required. In some embodiments, a defect verification tool, such as a SEM review tool may be integrated with TSOM/SHG system 100 as a single wafer processing tool, or, alternatively, separated into different wafer processing systems individually, or in any combination.

Computing system 130 coordinates the inspection processes, and performs analyses, data handling, and communication tasks. Similarly, computing system 160 coordinates the material removal and review processes, performs analyses, and performs data handling and communication tasks.

Defect verification can be accomplished in many different ways. In some embodiments, voltage contrast inspection is performed to verify defects. In these embodiments, a wafer is decorated in accordance with a small sample plan and voltage contrast measurements are performed on the decorated wafer by a voltage contrast inspection tool.

In some other embodiments, wafer fabrication is completed and a bit-map test is performed on the finished wafer to verify defects.

In some other embodiments, a wafer is de-processed to remove layers of the multiple layer structure under consideration. De-processing may be accomplished by chemical processes, mechanical processes, or both. In on example, a focused ion beam (FIB) tool is employed to remove material from the surface of a wafer. The wafer is de-processed until the buried defects are located at or near the surface of the wafer and can be effectively imaged by defect verification tool 151, e.g., a SEM review tool, TSOM/SHG system 100, etc. Defect locations and associated defect images 152 associated with defect verification measurements are stored in a memory (e.g., memory 162 on board computing system 160). In some embodiments, the defect information is stored in the form of a KLA results file (KLARF). The KLARF file is a flat ASCII file produced by the defect verification tool 151. The same KLARF file format is used to save defect information from TSOM/SHG system 100.

In a further aspect, defect information 141 associated with defects identified by TSOM/SHG system 100 as part of defect discovery is communicated to computing system 160. Computing system 160 samples the identified defects to generate a diversity set of DOIs 153 communicated to defect verification tool 151. In some embodiments, computing system 160 bins the defects identified by TSOM/SHG system 100 during defect discovery (e.g., 100 million or more DOIs) and selects a few defects from each bin to generate the diversity set of DOIs 153. The diversity set of DOIs 153 are saved in a memory (e.g., memory 162 on board computing system 160).

Defect verification measurements are performed on the diversity set of DOIs. The defect locations and associated defect images from the defect verification measurements are stored in a memory (e.g., memory 162 on board computing system 160). In some embodiments, defect information associated with the diversity set of DOIs is also stored in a KLARF file format.

Defect verification data from the diversity set of DOIs, any other set of verified defects, or a combination thereof, are mapped to the saved through focus defect image patches and corresponding feature vectors. The defect verification data and the corresponding through focus defect image patches and corresponding feature vectors are employed to train a nuisance elimination filter.

In one example, computing system 160 trains a through focus image based machine learning network to filter out nuisance defects. In some of these examples, the machine learning network is trained based on defect images. By way of non-limiting example, a suitable machine learning network is implemented as a neural network, a support vector machines model, a decision tree model, etc.

In another example, computing system 160 trains a through focus feature based automated classifier to filter out nuisance defects. In some of these examples, the automated classifier is feature based, rather than image based. By way of non-limiting example, a suitable through focus feature based automated classifier is implemented as a trained random forest algorithm, etc.

In another example, computing system 160 implements a rule based tree classifier to filter out nuisance defects. In some of these examples, the rule based tree classifier is feature based, rather than image based. By way of non-limiting example, a suitable rule based tree classifier is implemented based on manually generated rules.

The trained nuisance elimination filter 142 is communicated to TSOM/SHG system 100 and applied to the saved defect images associated with each optics mode under consideration. In this manner, defect detection is emulated using the through focus defect events recorded during defect discovery. Detection threshold values associated with each optical mode are adjusted to achieve a desirable nuisance rate. In one example, the detection threshold values associated with each optical mode are adjusted to achieve a nuisance rate of approximately 30%, and the optical mode that achieves the best defect signature matching and real defect capture rate is selected for implementation as the production measurement recipe for the measurement application under consideration. In the embodiment depicted in FIG. 2, TSOM/SHG system 100 implements nuisance filter 142 and the selected production measurement recipe to identify and classify defects based on an analysis of three dimensional images of thick semiconductor structures in a production setting.

In general, computing systems 130 and 160 are configured to detect and classify defects based on through focus images of SHG light or feature vectors derived from TSOM/SHG images. Computing systems 130 and 160 may include any appropriate processor(s) known in the art. In addition, computing systems 130 and 160 may be configured to use any appropriate defect detection algorithm or method known in the art. For example, computing systems 130 and 160 may use a die-to-database comparison or a thresholding algorithm to detect defects on the specimen.

In addition, TSOM/SHG system 100 may include peripheral devices useful to accept inputs from an operator (e.g., keyboard, mouse, touchscreen, etc.) and display outputs to the operator (e.g., display monitor). Input commands from an operator may be used by computing system 130 to adjust threshold values used to control illumination power. The resulting power levels may be graphically presented to an operator on a display monitor.

Figure 5:
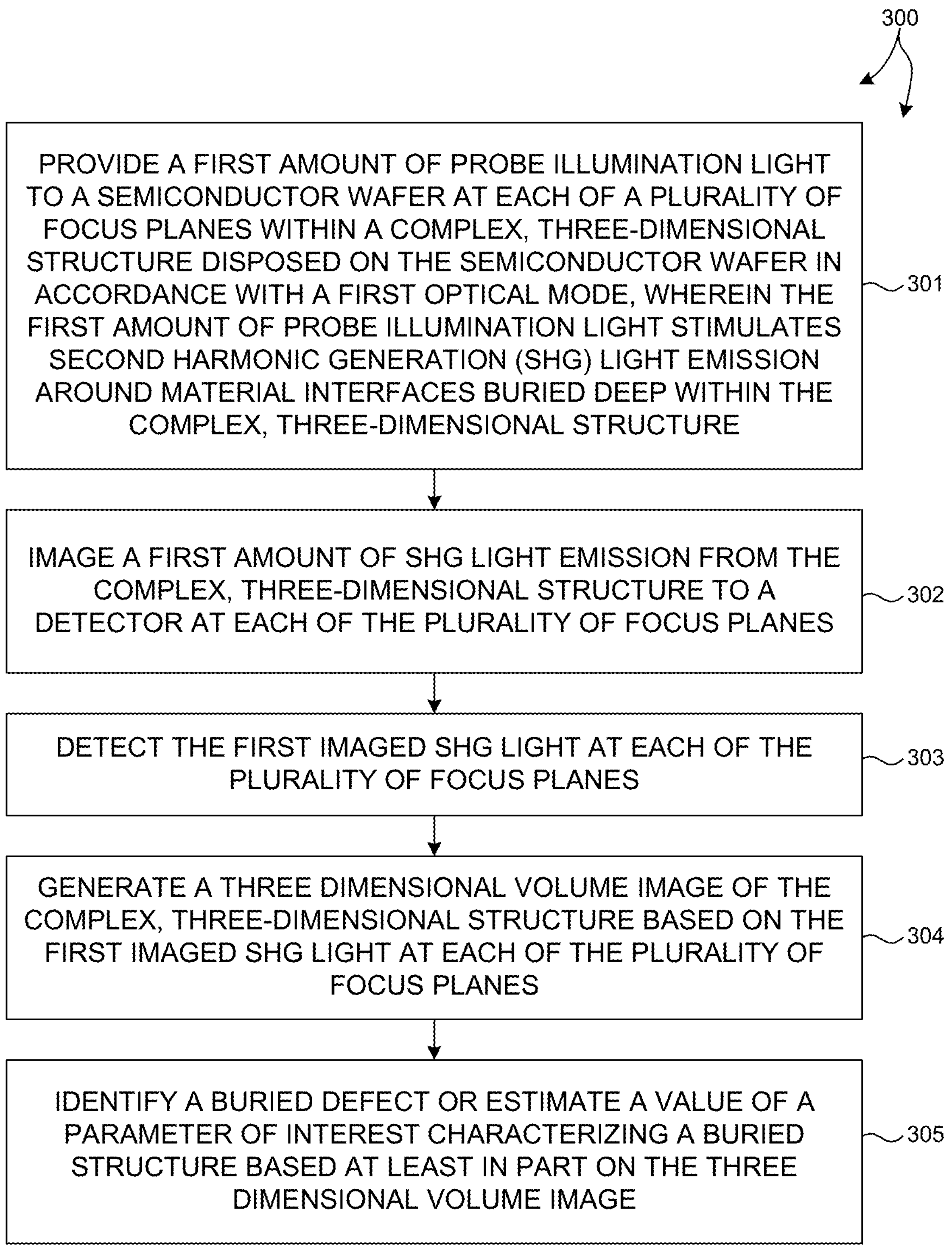
FIG. 5 is a flowchart illustrative of an exemplary method for detecting buried defects and measuring buried structures based on 3-D images of second harmonic generation light.

FIG. 5 illustrates a flowchart of an exemplary method 300 useful for detecting buried defects and measuring buried structures based on 3-D images of SHG light. In some non-limiting examples, TSOM/SHG systems 100 and 200 described with reference to FIGS. 2 and 3 are configured to implement method 300. However, in general, the implementation of method 300 is not limited by the specific embodiments described herein.

In block 301, a first amount of probe illumination light is provided to a semiconductor wafer at each of a plurality of focus planes within a complex, three-dimensional structure disposed on the semiconductor wafer in accordance with a first optical mode. The first amount of probe illumination light stimulates second harmonic generation (SHG) light emission around material interfaces buried deep within the complex, three-dimensional structure.

In block 302, a first amount of SHG light emission is imaged from the complex, three-dimensional structure to a detector at each of the plurality of focus planes.

In block 303, the first imaged SHG light is detected at each of the plurality of focus planes.

In block 304, a three dimensional volume image of the complex, three-dimensional structure is generated based on the first imaged SHG light at each of the plurality of focus planes.

In block 305, a buried defect is identified or a value of a parameter of interest characterizing a buried structure is estimated based at least in part on the three dimensional volume image.

It should be recognized that the various steps described throughout the present disclosure may be carried out by a single computer system 130 or, alternatively, a multiple computer system 130. Moreover, different subsystems of TSOM/SHG systems 100 and 200, such as the specimen positioning system 114, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to detector 125, illumination sources, illumination optics, collection optics, and specimen positioning system 114 in any manner known in the art. For example, the one or more computing systems 130 may be coupled to computing systems associated with detector 125, illumination sources, illumination optics, collection optics, and specimen positioning system 114, respectively. In another example, any of detector 125, illumination sources, illumination optics, collection optics, and specimen positioning system 114 may be controlled directly by a single computer system coupled to computer system 130.

The computer system 130 of TSOM/SHG systems 100 and 200 may be configured to receive and/or acquire data or information from the subsystems of the system (e.g., detector 125, illumination sources, illumination optics, collection optics, and specimen positioning system 114, and the like) by a transmission medium that may include wireline and/or wireless portions. In this manner, the transmission medium may serve as a data link between the computer system 130 and other subsystems of systems 100 and 200.

Computer system 130 of TSOM/SHG systems 100 and 200 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., output signals 127) from a storage medium (i.e., memory 132) via a data link. For instance, image results obtained using detector 125 may be stored in a permanent or semi-permanent memory device (e.g., memory 132). In this regard, the measurement results may be imported from on-board memory or from an external memory system. Moreover, the computer system 130 may send data to other systems via a transmission medium. For instance, defect locations and specimen parameter values determined by computer system 130 may be stored in a permanent or semi-permanent memory device. In this regard, measurement results may be exported to another system.

Computing systems 130 and 160 may include, but are not limited to, personal computer systems, mainframe computer systems, workstations, image computers, parallel processors, networked computer systems, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 2, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, a solid-state memory, a magnetic tape, etc.

TSOM/SHG system 100 includes a processor 131 and an amount of computer readable memory 132. Processor 131 and memory 132 may communicate over bus 133. Memory 132 includes an amount of memory 134 that stores an amount of program code that, when executed by processor 131, causes processor 131 to execute the defect detection, classification, and depth estimation functionality described herein.

System 150 includes a processor 161 and an amount of computer readable memory 162. Processor 161 and memory 162 may communicate over bus 163. Memory 162 includes an amount of memory 164 that stores an amount of program code that, when executed by processor 161, causes processor 161 to execute the defect detection, classification, and depth estimation functionality described herein.

In general, the three dimensional imaging techniques described herein can be applied during research and development, production ramp, and high volume production phases of manufacture of semiconductor devices, and is applicable to any optical, image-based measurement technique. In some embodiments, TSOM/SHG inspection and metrology as described herein is implemented as part of a fabrication process tool. Examples of fabrication process tools include, but are not limited to, lithographic exposure tools, film deposition tools, implant tools, and etch tools. In this manner, the results of TSOM/SHG measurements are used to control a fabrication process. In one example, TSOM/SHG measurement data collected from one or more targets is sent to a fabrication process tool. The x-ray data is analyzed and the results used to adjust the operation of the fabrication process tool.

Regardless of the particular type of fabrication process, defects need to be detected in all levels of a multiple layer stack and as early as possible in the particular process. Certain inspection embodiments preferably include detection of defects throughout a stack, including the stack surface and throughout the various depths of a stack. The thickness of a vertical ONON or OPOP stack under inspection is limited only by the depth of penetration of the illumination light. Transmission through an oxide-nitride-oxide-nitrite (ONON) or oxide-polysilicon-oxide-polysilicon (OPOP) stack is limited less by absorption at longer wavelengths. Thus, longer illumination wavelengths may be employed to effectively inspect very deep structures.

The three dimensional imaging techniques described herein can be applied to complex, vertically stacked structures, including, but not limited to 3D negative-AND (NAND) gate memory devices. Although TSOM/SHG systems and techniques are described herein as being applied to certain types of vertical NAND (VNAND) memory structures, it is understood that embodiments of the present invention may be applied to any suitable 3D or vertical semiconductor structures, such as NAND or NOR memory devices formed using terabit cell array transistors (TCAT), vertical-stacked array transistors (VSAT), bit cost scalable technology (BiCST), piped shaped BiCS technology (P-BiCS), etc. The vertical direction is generally a direction that is perpendicular to the substrate surface. Additionally, although particular fabrication steps, processes, and materials are described for forming such 3D structures, inspection embodiments may be applied at any point in the fabrication flow that results in multiple layers being formed on a substrate, and such layers may include any number and type of materials.

Various embodiments are described herein for an inspection system or tool that may be used for inspecting a specimen or a metrology system or tool that may be used for measuring specimen. The term "specimen" is used herein to refer to a wafer, a reticle, or any other sample that may be inspected or measured for defects, features, or other information (e.g., an amount of haze or film properties) known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. In one example, a detector may include a fiber array. In one example, TSOM/SHG system 100 may include more than one light source (not shown). The light sources may be configured differently or the same. For example, the light sources may be configured to generate light having different characteristics that can be directed to a wafer at the same or different illumination areas at the same or different angles of incidence at the same or different times. The light sources may be configured according to any of the embodiments described herein. In addition one of the light sources may be configured according to any of the embodiments described herein, and another light source may be any other light source known in the art. In some embodiments, a TSOM/SHG system may illuminate the wafer over more than one illumination area simultaneously. The multiple illumination areas may spatially overlap. The multiple illumination areas may be spatially distinct. In some embodiments, a TSOM/SHG system may illuminate the wafer over more than one illumination area at different times. The different illumination areas may temporally overlap (i.e., simultaneously illuminated over some period of time). The different illumination areas may be temporally distinct. In general, the number of illumination areas may be arbitrary, and each illumination area may be of equal or different size, orientation, and angle of incidence. In yet another example, TSOM/SHG system 100 may be a scanning spot system with one or more illumination areas that scan independently from any motion of wafer 103. In some embodiments an illumination area is made to scan in a repeated pattern along a scan line. The scan line may or may not align with the scan motion of wafer 103. Although as presented herein, wafer positioning system 114 generates motion of wafer 103 by coordinated rotational and translational movements, in yet another example, wafer positioning system 114 may generate motion of wafer 103 by coordinating two translational movements. For example, wafer positioning system 114 may generate motion along two orthogonal, linear axes (e.g., X-Y motion).

Accordingly, various modifications, adaptations, and combinations of various features of the described embodiments can be practiced without departing from the scope of the invention as set forth in the claims.

What is claimed is:

1. A system comprising:

an illumination subsystem that provides a first amount of probe illumination light to a semiconductor wafer at each of a plurality of focus planes within a complex, three-dimensional structure disposed on the semiconductor wafer in accordance with a first optical mode, wherein the first amount of probe illumination light stimulates second harmonic generation (SHG) light emission around material interfaces buried deep within the complex, three-dimensional structure;

a collection subsystem that images a first amount of the SHG light emission from the complex, three-dimensional structure to a detector at each of the plurality of focus planes in accordance with the first optical mode, wherein the detector detects the first imaged SHG light at each of the plurality of focus planes; and a computing system configured to:

generate a three dimensional volume image of the complex, three-dimensional structure based on the first imaged SHG light at each of the plurality of focus planes; and identify a buried defect or estimate a value of a parameter of interest characterizing a buried structure based at least in part on the three dimensional volume image.

2. The system of claim 1, further comprising:

an exogenous illumination source that provides an amount of exogenous illumination light to the complex, three-dimensional structure disposed on the semiconductor wafer during at least a portion of a time the illumination subsystem provides the first amount of probe illumination light to the semiconductor wafer at each of the plurality of focus planes.

3. The system of claim 1, further comprising:

an external electric field source that generates an external electric field across the complex, three-dimensional structure disposed on the semiconductor wafer during at least a portion of a time the illumination subsystem provides the first amount of probe illumination light to the semiconductor wafer at each of the plurality of focus planes.

4. The system of claim 1, wherein the identifying of the buried defect involves any of a comparison between the three dimensional volume image and a reference image and a comparison between the three dimensional volume image and a simulated reference image or library of simulated reference images.

5. The system of claim 1, wherein the illumination subsystem provides a second amount of probe illumination light to the semiconductor wafer at each of the plurality of focus planes within the complex, three-dimensional structure in accordance with a second optical mode, wherein the collection subsystem images a second amount of SHG light emission from the complex, three-dimensional structure to the detector at each of the plurality of focus planes in accordance with the second optical mode, wherein the detector detects the first imaged SHG light and the second imaged SHG light at each of the plurality of focus planes, and wherein the computing system generates the three dimensional volume image of the complex, three-dimensional structure based on differences between the first imaged SHG light and the second imaged SHG light at each of the plurality of focus planes.

6. The system of claim 5, wherein the first optical mode and the second optical mode differ in any of a wavelength of the probe illumination light, a polarization of the probe illumination light, and an angle of incidence of the probe illumination light.

7. The system of claim 1, wherein the collection subsystem includes a spectral filter located in a collection optical path of the collection subsystem, wherein the spectral filter separates the SHG light emission from collected light having wavelengths corresponding to wavelengths of the first amount of probe illumination light.

8. The system of claim 1, wherein the first amount of probe illumination light is provided to the semiconductor wafer at a normal angle of incidence with respect to a top surface of the semiconductor wafer.

9. The system of claim 1, wherein the first amount of probe illumination light is provided to the semiconductor wafer at an oblique angle of incidence with respect to a top surface of the semiconductor wafer.

10. The system of claim 1, wherein the complex, three-dimensional structure is a Gate-All-Around (GAA) device structure.

11. A method comprising:

providing a first amount of probe illumination light to a semiconductor wafer at each of a plurality of focus planes within a complex, three-dimensional structure disposed on the semiconductor wafer in accordance with a first optical mode, wherein the first amount of probe illumination light stimulates second harmonic generation (SHG) light emission around material interfaces buried deep within the complex, three-dimensional structure;

imaging a first amount of SHG light emission from the complex, three-dimensional structure to a detector at each of the plurality of focus planes;

detecting the first imaged SHG light at each of the plurality of focus planes; and generating a three dimensional volume image of the complex, three-dimensional structure based on the first imaged SHG light at each of the plurality of focus planes; and identifying a buried defect or estimating a value of a parameter of interest characterizing a buried structure based at least in part on the three dimensional volume image.

12. The method of claim 11, further comprising:

providing an amount of exogenous illumination light to the complex, three-dimensional structure disposed on the semiconductor wafer during at least a portion of a time the illumination subsystem provides the first amount of probe illumination light to the semiconductor wafer at each of the plurality of focus planes, wherein the amount of exogenous illumination light is different from the first amount of probe illumination light.

13. The method of claim 11, further comprising:

generating an external electric field across the complex, three-dimensional structure disposed on the semiconductor wafer during at least a portion of a time the illumination subsystem provides the first amount of probe illumination light to the semiconductor wafer at each of the plurality of focus planes.

14. The method of claim 11, wherein the identifying of the buried defect involves any of a comparison between the three dimensional volume image and a reference image and a comparison between the three dimensional volume image and a simulated reference image or library of simulated reference images.

15. The method of claim 11, further comprising:

providing a second amount of probe illumination light to the semiconductor wafer at each of the plurality of focus planes within the complex, three-dimensional structure in accordance with a second optical mode;

imaging a second amount of SHG light emission from the complex, three-dimensional structure to the detector at each of the plurality of focus planes in accordance with the second optical mode;

detecting the first imaged SHG light and the second imaged SHG light at each of the plurality of focus planes, wherein the generating of the three dimensional volume image of the complex, three-dimensional structure is based on differences between the first imaged SHG light and the second imaged SHG light at each of the plurality of focus planes.

16. The method of claim 15, wherein the first optical mode and the second optical mode differ in any of a wavelength of the probe illumination light, a polarization of the probe illumination light, and an angle of incidence of the probe illumination light.

17. The method of claim 11, further comprising:

filtering the SHG light emission from collected light having wavelengths corresponding to wavelengths of the probe illumination light.

18. The method of claim 11, wherein the first amount of probe illumination light is provided to the semiconductor wafer at a normal angle of incidence or an oblique angle of incidence with respect to a top surface of the semiconductor wafer.

19. The method of claim 11, wherein the complex, three-dimensional structure is a Gate-All-Around (GAA) device structure.

20. A system comprising:

an illumination subsystem that provides a first amount of probe illumination light to a semiconductor wafer at each of a plurality of focus planes within a complex, three-dimensional structure disposed on the semiconductor wafer in accordance with a first optical mode, wherein the first amount of probe illumination light stimulates second harmonic generation (SHG) light emission around material interfaces buried deep within the complex, three-dimensional structure;

a collection subsystem that images a first amount of the SHG light emission from the complex, three-dimensional structure to a detector at each of the plurality of focus planes in accordance with the first optical mode, wherein the detector detects the first imaged SHG light at each of the plurality of focus planes; and a non-transitory, computer-readable medium storing instructions, that when executed by one or more processors, cause the one or more processors to:

generate a three dimensional volume image of the complex, three-dimensional structure based on the first imaged SHG light at each of the plurality of focus planes; and identify a buried defect or estimate a value of a parameter of interest characterizing a buried structure based at least in part on the three dimensional volume image.

* * * * *